US012699589B2

(12) United States Patent
Chachad et al.

(10) Patent No.: US 12,699,589 B2
(45) Date of Patent: **\*Aug. 4, 2026**

(54) GLOBAL COHERENCE OPERATIONS

(71) Applicant: TEXAS INSTRUMENTS INCORPORATED, Dallas, TX (US)

(72) Inventors: Abhijeet Ashok Chachad, Plano, TX (US); Naveen Bhoria, Plano, TX (US); David Matthew Thompson, Dallas, TX (US); Neelima Muralidharan, Murphy, TX (US)

(73) Assignee: TEXAS INSTRUMENTS INCORPORATED, Dallas, TX (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/908,970

(22) Filed: Oct. 8, 2024

(65) Prior Publication Data

US 2025/0028551 A1 Jan. 23, 2025

Related U.S. Application Data

(63) Continuation of application No. 18/456,568, filed on Aug. 28, 2023, now Pat. No. 12,141,601, which is a
(Continued)

(51) Int. Cl.
*G06F 9/46* (2006.01)
*G06F 9/30* (2018.01)
(Continued)

(52) U.S. Cl.
CPC .......... *G06F 9/467* (2013.01); *G06F 9/30047* (2013.01); *G06F 9/30079* (2013.01);
(Continued)

(58) Field of Classification Search
CPC ............. G06F 9/30047; G06F 9/30079; G06F 9/30098; G06F 9/30101; G06F 9/30189;
(Continued)

(56) References Cited

U.S. PATENT DOCUMENTS 5,195,089 A 3/1993 Sindhu
5,651,136 A 7/1997 Denton
(Continued)

FOREIGN PATENT DOCUMENTS

CA 2238586 A1 12/1998
CN 102016810 A 4/2011
(Continued)

OTHER PUBLICATIONS

International Search Report for PCT/US2020/034458 mailed Aug. 27, 2020.
(Continued)

*Primary Examiner* — Aracelis Ruiz
(74) *Attorney, Agent, or Firm* — Michelle F. Murray; Frank D. Cimino

(57) ABSTRACT

A method includes receiving, by a L2 controller, a request to perform a global operation on a L2 cache and preventing new blocking transactions from entering a pipeline coupled to the L2 cache while permitting new non-blocking transactions to enter the pipeline. Blocking transactions include read transactions and non-victim write transactions. Non-blocking transactions include response transactions, snoop transactions, and victim transactions. The method further includes, in response to an indication that the pipeline does not contain any pending blocking transactions, preventing new snoop transactions from entering the pipeline while permitting new response transactions and victim transactions to enter the pipeline; in response to an indication that the pipeline does not contain any pending snoop transactions, preventing, all new transactions from entering the pipeline; and, in response to an indication that the pipeline does not contain any pending transactions, performing the global operation on the L2 cache.

20 Claims, 11 Drawing Sheets

Related U.S. Application Data continuation of application No. 17/713,287, filed on Apr. 5, 2022, now Pat. No. 11,740,930, which is a continuation of application No. 16/882,365, filed on May 22, 2020, now Pat. No. 11,294,707.

(60) Provisional application No. 62/852,461, filed on May 24, 2019.

(51) Int. Cl.

| | |
|---|---|
| *G06F 9/38* | (2018.01) |
| *G06F 9/448* | (2018.01) |
| *G06F 9/48* | (2006.01) |
| *G06F 9/54* | (2006.01) |
| *G06F 11/30* | (2006.01) |
| *G06F 12/0804* | (2016.01) |
| *G06F 12/0811* | (2016.01) |
| *G06F 12/0813* | (2016.01) |
| *G06F 12/0817* | (2016.01) |
| *G06F 12/0831* | (2016.01) |
| *G06F 12/0855* | (2016.01) |
| *G06F 12/0871* | (2016.01) |
| *G06F 12/0888* | (2016.01) |
| *G06F 12/0891* | (2016.01) |
| *G06F 12/12* | (2016.01) |
| *G06F 12/121* | (2016.01) |
| *G06F 13/16* | (2006.01) |

(52) U.S. Cl.
CPC ...... *G06F 9/30098* (2013.01); *G06F 9/30101* (2013.01); *G06F 9/30189* (2013.01); *G06F 9/3867* (2013.01); *G06F 9/4498* (2018.02); *G06F 9/4881* (2013.01); *G06F 9/544* (2013.01); *G06F 11/3037* (2013.01); *G06F 12/0811* (2013.01); *G06F 12/0813* (2013.01); *G06F 12/0824* (2013.01); *G06F 12/0828* (2013.01); *G06F 12/0831* (2013.01); *G06F 12/0855* (2013.01); *G06F 12/0871* (2013.01); *G06F 12/0888* (2013.01); *G06F 12/0891* (2013.01); *G06F 12/12* (2013.01); *G06F 13/1668* (2013.01); *G06F 12/0804* (2013.01); *G06F 12/121* (2013.01); *G06F 2212/1016* (2013.01); *G06F 2212/1044* (2013.01); *G06F 2212/621* (2013.01)

(58) Field of Classification Search
CPC ...... G06F 9/3867; G06F 9/4498; G06F 9/467; G06F 9/4881; G06F 9/544; G06F 11/3037; G06F 12/0804; G06F 12/0811; G06F 12/0813; G06F 12/0824; G06F 12/0828; G06F 12/0831; G06F 12/0855; G06F 12/0871; G06F 12/0888; G06F 12/0891; G06F 12/12; G06F 12/121; G06F 13/1668
See application file for complete search history.

(56) References Cited

U.S. PATENT DOCUMENTS

| | | |
|---|---|---|
| 5,860,114 A | 1/1999 | Sell |
| 5,926,830 A | 7/1999 | Feiste |
| 5,940,858 A | 8/1999 | Green |
| 6,145,054 A | 11/2000 | Mehrotra |
| 6,148,372 A | 11/2000 | Mehrotra |
| 6,148,416 A | 11/2000 | Masubuchi |
| 6,226,713 B1 | 5/2001 | Mehrotra |
| 6,430,654 B1 | 8/2002 | Mehrotra |
| 6,748,495 B2 | 6/2004 | Rowlands |
| 6,775,750 B2 | 8/2004 | Krueger |
| 6,915,396 B2 | 7/2005 | Wiens |
| 6,918,021 B2 | 7/2005 | Krick |
| 6,928,517 B1 | 8/2005 | Englin |
| 7,062,631 B1 | 6/2006 | Klaiber |
| 7,127,561 B2 | 10/2006 | Hill et al. |
| 7,386,685 B2 | 6/2008 | Blumrich et al. |
| 7,631,132 B1 | 12/2009 | Neuman |
| 7,769,956 B2 | 8/2010 | Tsien |
| 8,094,677 B2 | 1/2012 | Juan |
| 8,095,734 B2 | 1/2012 | Lippert et al. |
| 8,131,948 B2 | 3/2012 | Moyer |
| 8,181,005 B2 | 5/2012 | Zuraski, Jr. |
| 8,266,383 B1 | 9/2012 | Minkin et al. |
| 8,271,993 B2 | 9/2012 | Keladi |
| 8,327,082 B2 | 12/2012 | Moyer |
| 8,341,353 B2 | 12/2012 | Venkumahanti |
| 9,092,156 B1 | 7/2015 | Xu |
| 9,170,955 B2 | 10/2015 | Forsyth |
| 9,223,705 B2 | 12/2015 | Jayaseelan |
| 9,229,729 B2 | 1/2016 | Sanner, III |
| 9,720,833 B2 | 8/2017 | Drapala |
| 10,459,866 B1 | 10/2019 | Fleming, Jr. |
| 10,891,240 B2 | 1/2021 | Mathew |
| 10,915,471 B2 | 2/2021 | Chofleming |
| 11,029,958 B1 | 6/2021 | Zhang |
| 11,194,617 B2 | 12/2021 | Chachad |
| 11,294,707 B2 | 4/2022 | Chachad |
| 11,307,987 B2 | 4/2022 | Chachad |
| 11,816,032 B2 | 11/2023 | Chachad |
| 2002/0083244 A1 | 6/2002 | Hammarlund |
| 2002/0124143 A1 | 9/2002 | Barroso |
| 2002/0129208 A1 | 9/2002 | Barroso et al. |
| 2002/0147889 A1 | 10/2002 | Kruckemyer |
| 2002/0169931 A1 | 11/2002 | Krick |
| 2002/0169935 A1 | 11/2002 | Krick |
| 2002/0174253 A1 | 11/2002 | Hayter |
| 2002/0188821 A1 | 12/2002 | Wiens |
| 2003/0028728 A1 | 2/2003 | Ito |
| 2003/0110356 A1 | 6/2003 | Gerard, III |
| 2003/0200404 A1 | 10/2003 | Wicki et al. |
| 2004/0083341 A1 | 4/2004 | Robinson |
| 2004/0117561 A1 | 6/2004 | Quach |
| 2005/0080994 A1 | 4/2005 | Cohen |
| 2006/0031640 A1 | 2/2006 | Henry |
| 2006/0059316 A1 | 3/2006 | Asher |
| 2006/0136915 A1 | 6/2006 | Aingaran |
| 2006/0155963 A1 | 7/2006 | Bohrer |
| 2006/0224829 A1 | 10/2006 | Evrard |
| 2006/0282622 A1 | 12/2006 | Sistla et al. |
| 2007/0055827 A1 | 3/2007 | Tsien |
| 2007/0186050 A1 | 8/2007 | Luick |
| 2007/0186073 A1 | 8/2007 | Luick |
| 2007/0260819 A1 | 11/2007 | Gao |
| 2008/0034024 A1 | 2/2008 | Savell |
| 2008/0082707 A1* | 4/2008 | Gupta ................... G06F 13/364 710/110 |
| 2008/0091880 A1 | 4/2008 | Vishin |
| 2008/0140934 A1 | 6/2008 | Luick |
| 2008/0205438 A1 | 8/2008 | Juan |
| 2008/0252032 A1 | 10/2008 | Keeler |
| 2008/0270692 A1 | 10/2008 | Cochran |
| 2008/0282032 A1 | 11/2008 | Shen |
| 2009/0049279 A1 | 2/2009 | Steiss |
| 2009/0132764 A1 | 5/2009 | Moll |
| 2009/0172289 A1 | 7/2009 | Yamamura |
| 2009/0182944 A1 | 7/2009 | Comparan |
| 2010/0005246 A1 | 1/2010 | Beers et al. |
| 2010/0057998 A1 | 3/2010 | Moyer |
| 2010/0058000 A1 | 3/2010 | Moyer |
| 2010/0088472 A1 | 4/2010 | Ukai |
| 2010/0274962 A1 | 10/2010 | Mosek |
| 2011/0016281 A1 | 1/2011 | Williamson |
| 2011/0072212 A1 | 3/2011 | Kojima |
| 2011/0082981 A1 | 4/2011 | Hoogerbrugge |
| 2011/0113196 A1 | 5/2011 | Hooker |
| 2011/0167243 A1 | 7/2011 | Yip |
| 2012/0042126 A1 | 2/2012 | Krick |
| 2012/0191914 A1 | 7/2012 | Tran |

(56) References Cited

U.S. PATENT DOCUMENTS

| | | |
|---|---|---|
| 2012/0191916 A1 | 7/2012 | Chachad |
| 2012/0221774 A1 | 8/2012 | Atkisson |
| 2012/0221793 A1 | 8/2012 | Tran |
| 2013/0117503 A1 | 5/2013 | Nellans et al. |
| 2013/0191601 A1 | 7/2013 | Peterson |
| 2014/0115279 A1 | 4/2014 | Chirca |
| 2014/0129811 A1 | 5/2014 | Yamauchi |
| 2014/0136793 A1 | 5/2014 | Robertson |
| 2014/0189245 A1 | 7/2014 | Rupley |
| 2014/0195737 A1 | 7/2014 | Lilly et al. |
| 2014/0201452 A1 | 7/2014 | Meredith |
| 2014/0258605 A1 | 9/2014 | Cai |
| 2014/0281242 A1 | 9/2014 | Abdallah |
| 2014/0297920 A1 | 10/2014 | Takeda |
| 2014/0297965 A1 | 10/2014 | Jayaseelan |
| 2014/0317351 A1 | 10/2014 | Rao |
| 2014/0317951 A1 | 10/2014 | Kauling |
| 2014/0365730 A1 | 12/2014 | Tsao |
| 2015/0006820 A1 | 1/2015 | Bhoria |
| 2015/0019840 A1 | 1/2015 | Anderson |
| 2015/0309939 A1 | 10/2015 | Sadoughi-Yarandi |
| 2015/0317248 A1 | 11/2015 | Lamb |
| 2017/0083444 A1 | 3/2017 | Dev |
| 2017/0123835 A1 | 5/2017 | Mizuno |
| 2017/0123987 A1 | 5/2017 | Cheng |
| 2017/0177500 A1 | 6/2017 | Shanbhogue |
| 2018/0004661 A1 | 1/2018 | Umehara |
| 2018/0060238 A1 | 3/2018 | Esser et al. |
| 2018/0232311 A1 | 8/2018 | Bhati |
| 2018/0293693 A1 | 10/2018 | Ray |
| 2019/0042445 A1 | 2/2019 | Swaminathan |
| 2019/0058731 A1 | 2/2019 | Garg |
| 2019/0065404 A1 | 2/2019 | Kabra |
| 2019/0155732 A1 | 5/2019 | Hagersten |
| 2019/0171573 A1 | 6/2019 | Rose et al. |
| 2019/0303159 A1 | 10/2019 | Fryman |
| 2019/0303297 A1 | 10/2019 | Fleming, Jr. |
| 2020/0004690 A1 | 1/2020 | Mathew |
| 2020/0104259 A1 | 4/2020 | Wang |
| 2020/0250099 A1 | 8/2020 | Campbell |
| 2020/0371924 A1 | 11/2020 | Chachad |
| 2020/0371925 A1 | 11/2020 | Chachad |
| 2020/0371926 A1 | 11/2020 | Chachad |
| 2020/0371935 A1 | 11/2020 | Chachad |
| 2021/0200541 A1 | 7/2021 | Zhang |
| 2021/0365374 A1 | 11/2021 | Chachad |
| 2021/0397524 A1 | 12/2021 | Chen |
| 2022/0100680 A1 | 3/2022 | Chrysos |

FOREIGN PATENT DOCUMENTS

| | | |
|---|---|---|
| CN | 105740168 B | 7/2018 |
| DE | 102018126650 A1 | 7/2019 |
| EP | 0481233 A2 | 4/1992 |
| EP | 1217526 A1 | 6/2002 |
| EP | 1150213 B1 | 1/2012 |
| KR | 101681423 | 11/2016 |
| WO | 2018031149 A1 | 2/2018 |
| WO | 2019194916 A1 | 10/2019 |
| WO | 2020005444 A1 | 1/2020 |
| WO | 2020005447 A1 | 1/2020 |
| WO | 2020243045 A1 | 12/2020 |

OTHER PUBLICATIONS

Barroso, et al; "Piranha: A Scalable Architecture Based on Single-Chip Multiprocessing"; ACM.ISCA 00; pp. 282-293.

Handy, Jim; The Cache Memory Book, 1998, Academic Press, 2nd edition, pp. 126-135.

IEEE.org IEEE Xplore; IEEE.sa; IEEE Spectrum; Advanced Search Results; 2021.

International Search Report for PCT/US2020/034472 mailed Aug. 27, 2020, 3 pgs.

International Search Report for PCT/US2020/034557 mailed Sep. 10, 2020.

International Search Report for PCT/US2020/034560 mailed Aug. 20, 2020.

Office Action for corresponding China Patent Application No. 202080038124.2 dated Apr. 25, 2025, 9 pgs.

International Search Report for PCT/US2020/034471 mailed Aug. 20, 2020.

Meaney, et al.; "IBM z990 Soft Error Detection and Recovery"; Sep. 2005; IEEE; IEEE Transactions on Device and Materials Reliability. vol. 5 pp. 419-417.

Sorin, et al.; A Primer on Memory Consistency and Cache Coherence; 2011; Morgan & Claypool; pp. 99-114.

* cited by examiner

100

102a — CPU 1   o o o   CPU N — 102n

104a — L1   o o o   L1 — 104n

106a — L2   o o o   L2 — 106n

108 — L3

110 — DDR

300

302 — CPU

L1 SRAM
312

LEVEL 1
CONTROLLER
310

L1 MAIN
CACHE — 314

L1 VICTIM
CACHE — 316

304

306

L2 SRAM
322

LEVEL 2
CONTROLLER
320

L2 CACHE — 324

SHADOW L1
MAIN CACHE — 326

SHADOW L1
VICTIM CACHE — 328

L3 SUBSYSTEM

LEVEL 3
CONTROLLER

Figure 7:
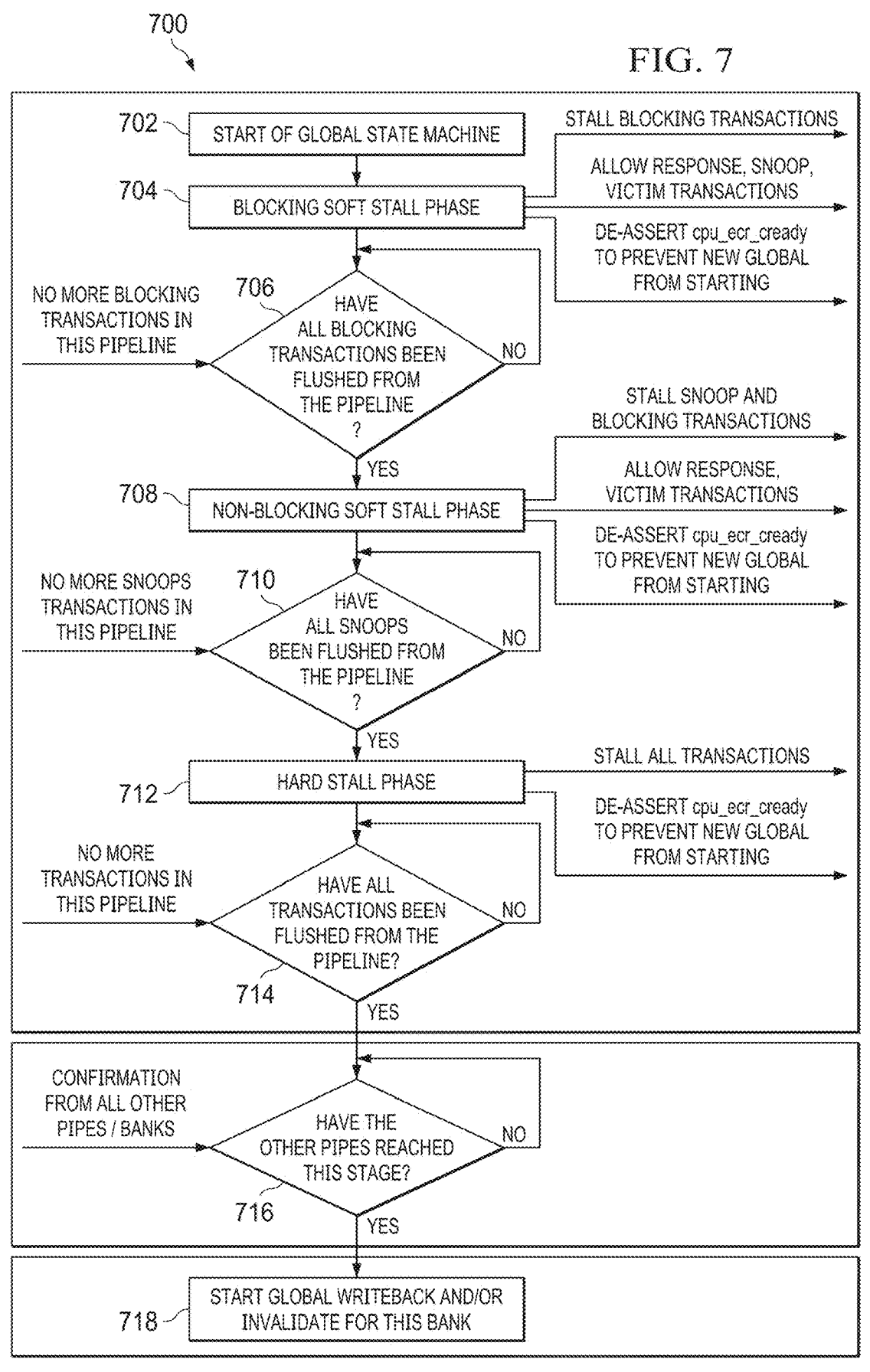

702 — START OF GLOBAL STATE MACHINE

STALL BLOCKING TRANSACTIONS

704 — BLOCKING SOFT STALL PHASE

ALLOW RESPONSE, SNOOP, VICTIM TRANSACTIONS

DE-ASSERT cpu_ecr_cready TO PREVENT NEW GLOBAL FROM STARTING

NO MORE BLOCKING TRANSACTIONS IN THIS PIPELINE

706 — HAVE ALL BLOCKING TRANSACTIONS BEEN FLUSHED FROM THE PIPELINE ? — NO

STALL SNOOP AND BLOCKING TRANSACTIONS

YES

708 — NON-BLOCKING SOFT STALL PHASE

ALLOW RESPONSE, VICTIM TRANSACTIONS

DE-ASSERT cpu_ecr_cready TO PREVENT NEW GLOBAL FROM STARTING

NO MORE SNOOPS TRANSACTIONS IN THIS PIPELINE

710 — HAVE ALL SNOOPS BEEN FLUSHED FROM THE PIPELINE ? — NO

YES

STALL ALL TRANSACTIONS

712 — HARD STALL PHASE

DE-ASSERT cpu_ecr_cready TO PREVENT NEW GLOBAL FROM STARTING

NO MORE TRANSACTIONS IN THIS PIPELINE

HAVE ALL TRANSACTIONS BEEN FLUSHED FROM THE PIPELINE? — NO

714 — YES

CONFIRMATION FROM ALL OTHER PIPES / BANKS

HAVE THE OTHER PIPES REACHED THIS STAGE? — NO

716 — YES

718 — START GLOBAL WRITEBACK AND/OR INVALIDATE FOR THIS BANK

800

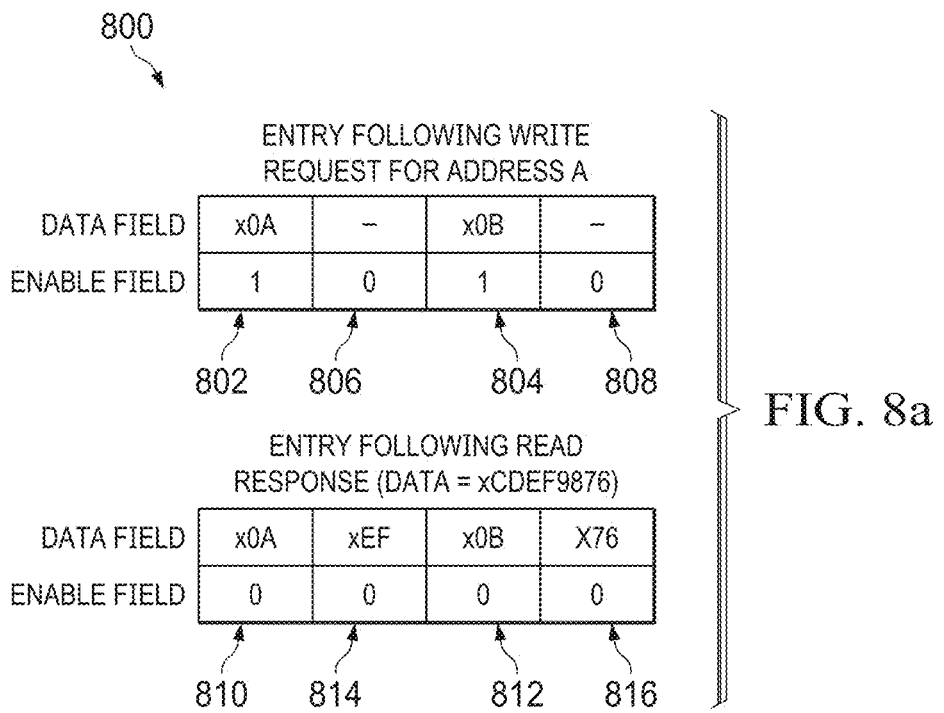

ENTRY FOLLOWING WRITE
REQUEST FOR ADDRESS A

| DATA FIELD | x0A | -- | x0B | -- |
| ENABLE FIELD | 1 | 0 | 1 | 0 |

ENTRY FOLLOWING READ
RESPONSE (DATA = xCDEF9876)

| DATA FIELD | x0A | xEF | x0B | X76 |
| ENABLE FIELD | 0 | 0 | 0 | 0 |

810    814    812    816

850

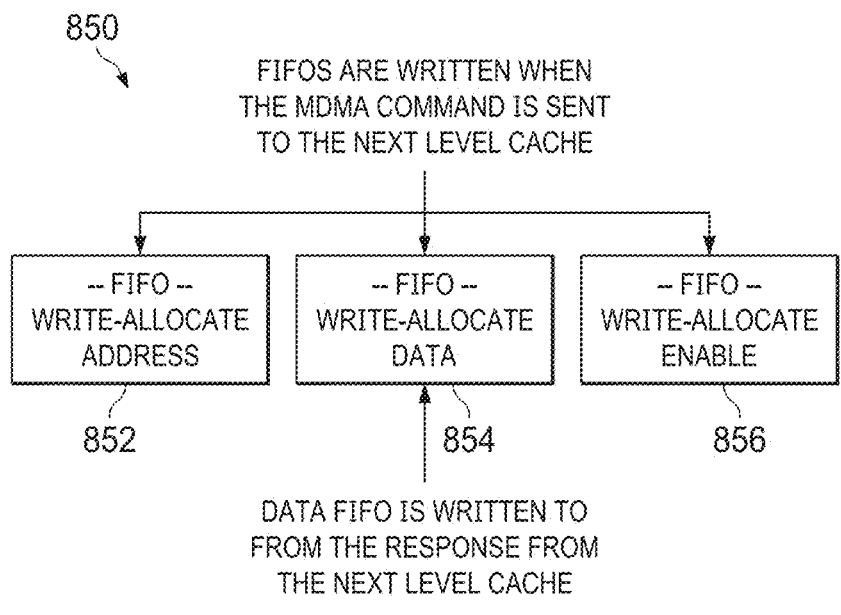

FIFOS ARE WRITTEN WHEN
THE MDMA COMMAND IS SENT
TO THE NEXT LEVEL CACHE

| -- FIFO --<br>WRITE-ALLOCATE<br>ADDRESS | -- FIFO --<br>WRITE-ALLOCATE<br>DATA | -- FIFO --<br>WRITE-ALLOCATE<br>ENABLE |

852            854            856

DATA FIFO IS WRITTEN TO
FROM THE RESPONSE FROM
THE NEXT LEVEL CACHE

FIG. 8b

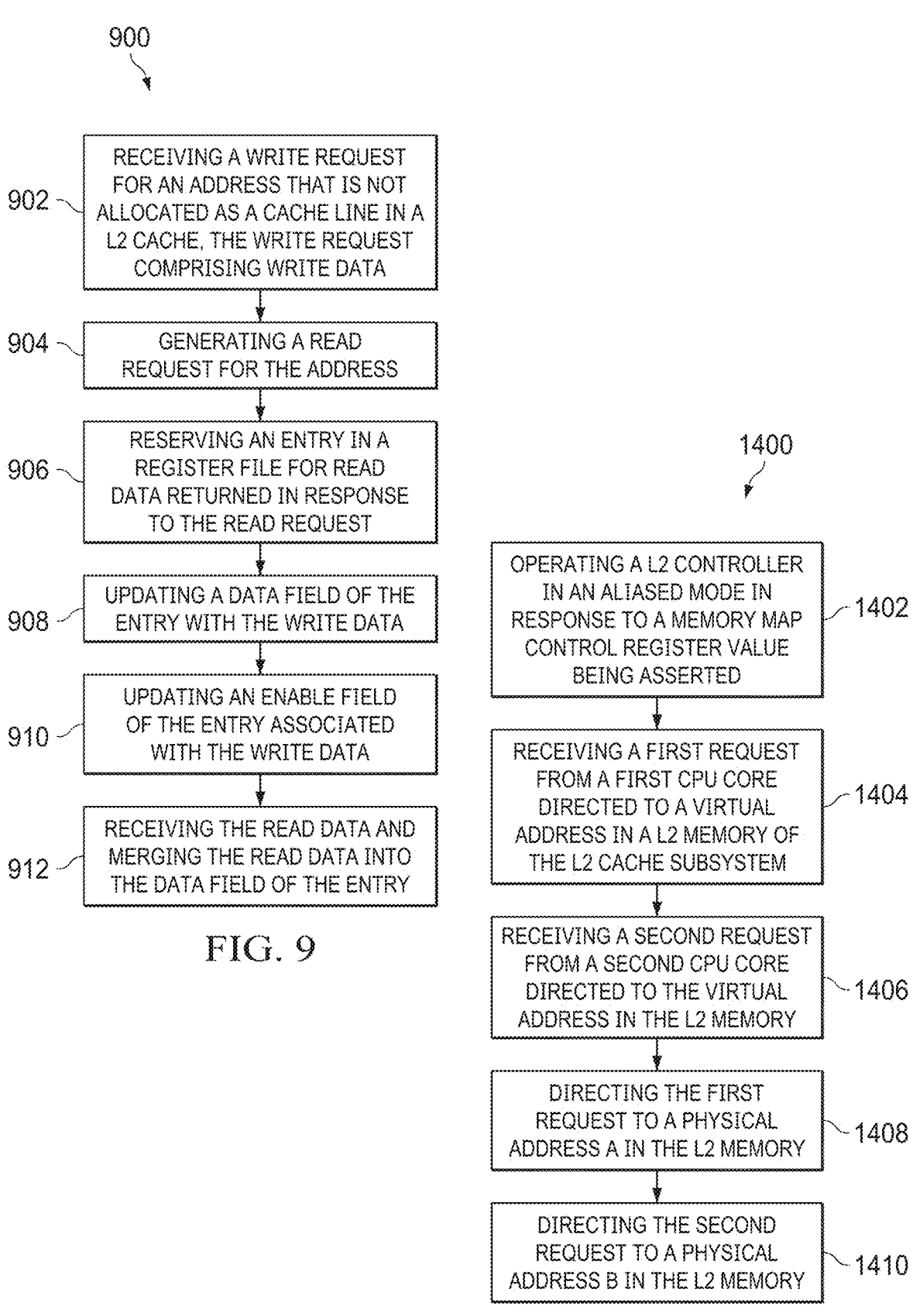

900

902 — RECEIVING A WRITE REQUEST FOR AN ADDRESS THAT IS NOT ALLOCATED AS A CACHE LINE IN A L2 CACHE, THE WRITE REQUEST COMPRISING WRITE DATA

904 — GENERATING A READ REQUEST FOR THE ADDRESS

906 — RESERVING AN ENTRY IN A REGISTER FILE FOR READ DATA RETURNED IN RESPONSE TO THE READ REQUEST

908 — UPDATING A DATA FIELD OF THE ENTRY WITH THE WRITE DATA

910 — UPDATING AN ENABLE FIELD OF THE ENTRY ASSOCIATED WITH THE WRITE DATA

912 — RECEIVING THE READ DATA AND MERGING THE READ DATA INTO THE DATA FIELD OF THE ENTRY

OPERATING A L2 CONTROLLER IN AN ALIASED MODE IN RESPONSE TO A MEMORY MAP CONTROL REGISTER VALUE BEING ASSERTED — 1402

RECEIVING A FIRST REQUEST FROM A FIRST CPU CORE DIRECTED TO A VIRTUAL ADDRESS IN A L2 MEMORY OF THE L2 CACHE SUBSYSTEM — 1404

RECEIVING A SECOND REQUEST FROM A SECOND CPU CORE DIRECTED TO THE VIRTUAL ADDRESS IN THE L2 MEMORY — 1406

DIRECTING THE FIRST REQUEST TO A PHYSICAL ADDRESS A IN THE L2 MEMORY — 1408

DIRECTING THE SECOND REQUEST TO A PHYSICAL ADDRESS B IN THE L2 MEMORY — 1410

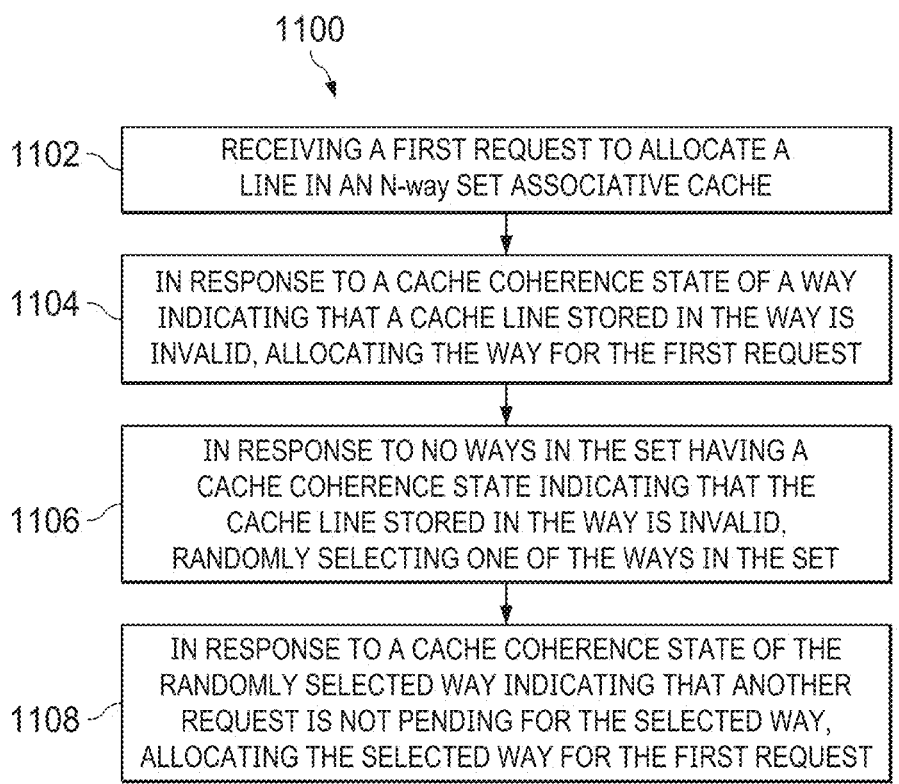

1102 — RECEIVING A FIRST REQUEST TO ALLOCATE A LINE IN AN N-way SET ASSOCIATIVE CACHE 1104 — IN RESPONSE TO A CACHE COHERENCE STATE OF A WAY INDICATING THAT A CACHE LINE STORED IN THE WAY IS INVALID, ALLOCATING THE WAY FOR THE FIRST REQUEST 1106 — IN RESPONSE TO NO WAYS IN THE SET HAVING A CACHE COHERENCE STATE INDICATING THAT THE CACHE LINE STORED IN THE WAY IS INVALID, RANDOMLY SELECTING ONE OF THE WAYS IN THE SET 1108 — IN RESPONSE TO A CACHE COHERENCE STATE OF THE RANDOMLY SELECTED WAY INDICATING THAT ANOTHER REQUEST IS NOT PENDING FOR THE SELECTED WAY, ALLOCATING THE SELECTED WAY FOR THE FIRST REQUEST

FIG. 11

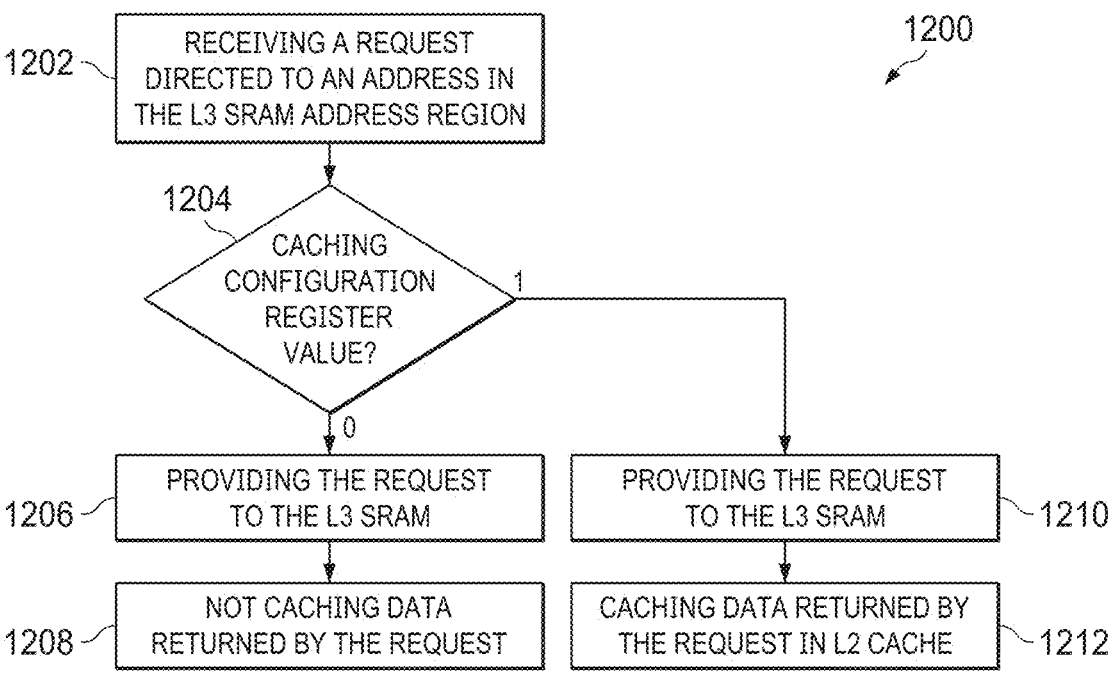

1200

1202 — RECEIVING A REQUEST DIRECTED TO AN ADDRESS IN THE L3 SRAM ADDRESS REGION

1204 CACHING CONFIGURATION REGISTER VALUE?

1 0

1206 — PROVIDING THE REQUEST TO THE L3 SRAM

1210 — PROVIDING THE REQUEST TO THE L3 SRAM

1208 — NOT CACHING DATA RETURNED BY THE REQUEST

1212 — CACHING DATA RETURNED BY THE REQUEST IN L2 CACHE

FIG. 12

GLOBAL COHERENCE OPERATIONS

CROSS-REFERENCE TO RELATED APPLICATIONS

This application is a continuation of U.S. patent application Ser. No. 18/456,568, filed Aug. 28, 2023, now U.S. Pat. No. 12,141,568, which is a continuation of U.S. patent application Ser. No. 17/713,287, filed Apr. 5, 2022, now U.S. Pat. No. 11,740,930, which is a continuation of U.S. patent application Ser. No. 16/882,365, filed May 22, 2020, now U.S. Pat. No. 11,294,707, which claims priority to U.S. Provisional Patent Application No. 62/852,461, filed May 24, 2019, each of which is hereby incorporated herein by reference in its entirety.

BACKGROUND

Some memory systems include a multi-level cache system, in which a hierarchy of memories (e.g., caches) provides varying access speeds to cache data. A first level (L1) cache is closely coupled to a central processing unit (CPU) core and provides the CPU core with faster access (e.g., relative to main memory) to cache data. A second level (L2) cache is also coupled to the CPU core and, in some examples, is larger and thus holds more data than the L1 cache, although the L2 cache provides relatively slower access to cache data than the L1 cache. Additional memory levels of the hierarchy are possible.

SUMMARY

In accordance with at least one example of the disclosure, a method includes receiving a first request to allocate a line in an N-way set associative cache and, in response to a cache coherence state of a way indicating that a cache line stored in the way is invalid, allocating the way for the first request. The method also includes, in response to no ways in the set having a cache coherence state indicating that the cache line stored in the way is invalid, randomly selecting one of the ways in the set. The method also includes, in response to a cache coherence state of the selected way indicating that another request is not pending for the selected way, allocating the selected way for the first request.

In accordance with another example of the disclosure, a method includes receiving a first request to allocate a line in an N-way set associative cache and, in response to a cache coherence state of a way indicating that a cache line stored in the way is invalid, allocating the way for the first request. The method also includes, in response to no ways in the set having a cache coherence state indicating that the cache line stored in the way is invalid, creating a masked subset of ways in the set by masking any way having a cache coherence state indicating that another request is pending for the way, randomly selecting one of the ways in the masked subset, and allocating the selected way for the first request.

In accordance with yet another example of the disclosure, a level two (L2) cache subsystem includes a L2 cache configured as an N-way set associative cache and a L2 controller configured to receive a first request to allocate a line in the L2 cache and, in response to a cache coherence state of a way indicating that a cache line stored in the way is invalid, allocate the way for the first request. The L2 controller is also configured to, in response to no ways in the set having a cache coherence state indicating that the cache line stored in the way is invalid, randomly select one of the ways in the set. The L2 controller is also configured to, in response to a cache coherence state of the selected way indicating that another request is not pending for the selected way, allocate the selected way for the first request.

In accordance with at least one example of the disclosure, a method includes receiving, by a first stage in a pipeline, a first transaction from a previous stage in the pipeline; determining whether the first transaction comprises a high priority transaction or a low priority transaction; in response to the first transaction comprising a high priority transaction, processing the high priority transaction by sending the high priority transaction to an output buffer; receiving a second transaction from the previous stage; and determining whether the second transaction comprises a high priority transaction or a low priority transaction. In response to the second transaction comprising a low priority transaction, the method includes processing the low priority transaction by monitoring a full signal from the output buffer while sending the low priority transaction to the output buffer; in response to the full signal being asserted and no high priority transaction being available from the previous stage, pausing processing of the low priority transaction; in response to the full signal being asserted and a high priority transaction being available from the previous stage, stopping processing of the low priority transaction and processing the high priority transaction; and in response to the full signal being de-asserted, processing the low priority transaction by sending the low priority transaction to the output buffer.

In accordance with another example of the disclosure, a method includes receiving, by a first stage in a pipeline, a first transaction from a previous stage in a pipeline; determining whether the first transaction comprises a high priority transaction, a medium priority transaction, or a low priority transaction; in response to the first transaction comprising a high priority transaction, processing the high priority transaction by sending the high priority transaction to an output buffer. The method also includes receiving a second transaction from the previous stage; determining whether the second transaction comprises a medium priority transaction or a low priority transaction. In response to the second transaction comprising a medium priority transaction, the method includes processing the medium priority transaction by monitoring a full signal from the output buffer while sending the medium priority transaction to the output buffer; in response to the full signal being asserted and no high priority transaction being available from the previous stage, pausing processing of the medium priority transaction; in response to the full signal being asserted and a high priority transaction being available from the previous stage, stopping processing of the medium priority transaction and processing the high priority transaction; and in response to the full signal being de-asserted, processing the medium priority transaction by sending the medium priority transaction to the output buffer. The method also includes, in response to the second transaction comprising a low priority transaction, processing the low priority transaction by monitoring the full signal from the output buffer while sending the low priority transaction to the output buffer; in response to the full signal being asserted and no high or medium priority transaction being available from the previous stage, pausing processing of the low priority transaction; in response to the full signal being asserted and a high or medium priority transaction being available from the previous stage, stopping processing of the low priority transaction and processing the high or medium priority transaction; and in response to the full signal being de-asserted, processing the low priority transaction by sending the medium priority transaction to the output buffer.

In accordance with yet another example of the disclosure, a method includes level two (L2) cache subsystem, comprising a L2 pipeline and a state machine in the L2 pipeline. The state machine is configured to receive a first transaction from an input buffer coupled to a previous stage in the L2 pipeline; determine whether the first transaction comprises a high priority transaction, a medium priority transaction, or a low priority transaction; and in response to the first transaction comprising a high priority transaction, process the high priority transaction by sending the high priority transaction to an output buffer. The state machine is also configured to receive a second transaction from the input buffer; determine whether the second transaction comprises a medium priority transaction or a low priority transaction; and, in response to the second transaction comprising a medium priority transaction, process the medium priority transaction. When the state machine processes the medium priority transaction, the state machine is further configured to monitor a full signal from the output buffer while the medium priority transaction is sent to the output buffer; in response to the full signal being asserted and no high priority transaction being available from the input buffer, pause processing of the medium priority transaction; in response to the full signal being asserted and a high priority transaction being available from the input buffer, stop processing of the medium priority transaction and process the high priority transaction; and in response to the full signal being de-asserted, process the medium priority transaction by sending the medium priority transaction to the output buffer. The state machine is also configured to in response to the second transaction comprising a low priority transaction, process the low priority transaction. When the state machine processes the low priority transaction, the state machine is further configured to monitor the full signal from the output buffer while the low priority transaction is sent to the output buffer; in response to the full signal being asserted and no high or medium priority transaction being available from the input buffer, pause processing of the low priority transaction; in response to the full signal being asserted and a high or medium priority transaction being available from the input buffer, stop processing of the low priority transaction and process the high or medium priority transaction; and, in response to the full signal being de-asserted, process the low priority transaction by sending the medium priority transaction to the output buffer.

In accordance with at least one example of the disclosure, an apparatus includes a CPU core, a first cache subsystem coupled to the CPU core, and a second memory coupled to the cache subsystem. The first cache subsystem includes a configuration register, a first memory, and a controller. The controller is configured to: receive a request directed to an address in the second memory and, in response to the configuration register having a first value, operate in a non-caching mode. In the non-caching mode, the controller is configured to provide the request to the second memory without caching data returned by the request in the first memory. In response to the configuration register having a second value, the controller is configured to operate in a caching mode. In the caching mode the controller is configured to provide the request to the second memory and cache data returned by the request in the first memory.

In accordance with another example of the disclosure, a method includes receiving, by a level two (L2) controller comprising a configuration register, a request directed to an address in a level three (L3) memory; and, in response to the configuration register having a first value, operating the L2 controller in a non-caching mode by providing the request to the L3 memory and not caching data returned by the request in a L2 cache. In response to the configuration register having a second value, the method includes operating the L2 controller in a caching mode by providing the request to the second memory and caching data returned by the request in the L2 cache.

In accordance with yet another example of the disclosure, a level two (L2) cache subsystem includes a configuration register, a first memory, and a L2 controller. The L2 controller is configured to receive a request directed to an address in a second memory coupled to the L2 cache subsystem and, in response to the configuration register having a first value, operate in a non-caching mode. In the non-caching mode the L2 controller is configured to provide the request to the second memory without caching data returned by the request in the first memory. In response to the configuration register having a second value, the L2 controller operates in a caching mode. In the caching mode, the L2 controller is configured to provide the request to the second memory and cache data returned by the request in the first memory.

In accordance with at least one example of the disclosure, an apparatus includes first CPU and second CPU cores, a L1 cache subsystem coupled to the first CPU core and comprising a L1 controller, and a L2 cache subsystem coupled to the L1 cache subsystem and to the second CPU core. The L2 cache subsystem includes a L2 memory and a L2 controller configured to operate in an aliased mode in response to a value in a memory map control register being asserted. In the aliased mode, the L2 controller receives a first request from the first CPU core directed to a virtual address in the L2 memory, receives a second request from the second CPU core directed to the virtual address in the L2 memory, directs the first request to a physical address A in the L2 memory, and directs the second request to a physical address B in the L2 memory.

In accordance with at least one example of the disclosure, a method includes operating a level two (L2) controller of a L2 cache subsystem in an aliased mode in response to a memory map control register value being asserted. Operating the L2 controller in the aliased mode further comprises receiving a first request from a first CPU core directed to a virtual address in a L2 memory of the L2 cache subsystem, receiving a second request from a second CPU core directed to the virtual address in the L2 memory, directing the first request to a physical address A in the L2 memory, and directing the second request to a physical address B in the L2 memory.

In accordance with at least one example of the disclosure, a method includes receiving, by a level two (L2) controller, a write request for an address that is not allocated as a cache line in a L2 cache. The write request specifies write data. The method also includes generating, by the L2 controller, a read request for the address; reserving, by the L2 controller, an entry in a register file for read data returned in response to the read request; updating, by the L2 controller, a data field of the entry with the write data; updating, by the L2 controller, an enable field of the entry associated with the write data; and receiving, by the L2 controller, the read data and merging the read data into the data field of the entry.

In accordance with another example of the disclosure, a level two (L2) cache subsystem includes a L2 cache, a register file having an entry, and a L2 controller. The L2 controller is configured to receive a write request for an address that is not allocated as a cache line in the L2 cache, the write request comprising write data; generate a read request for the address; reserve the entry in the register file for read data returned in response to the read request; update a data field of the entry with the write data; update an enable field of the entry associated with the write data; and receive the read data and merge the read data into the data field of the entry.

In accordance with yet another example of the disclosure, an apparatus includes a central processing unit (CPU) core and a level one (L1) cache subsystem coupled to the CPU core. The L1 cache subsystem includes a L1 cache, and a L1 controller. The apparatus also includes a level two (L2) cache subsystem coupled to the L1 cache subsystem. The L2 cache subsystem includes a L2 cache, a register file having an entry, and a L2 controller. The L2 controller is configured to receive a write request for an address that is not allocated as a cache line in the L2 cache, the write request including write data; generate a read request for the address; reserve the entry in the register file for read data returned in response to the read request; update a data field of the entry with the write data; update an enable field of the entry associated with the write data; and receive the read data and merge the read data into the data field of the entry.

In accordance with at least one example of the disclosure, a method includes receiving, by a L2 controller, a request to perform a global operation on a L2 cache and preventing new blocking transactions from entering a pipeline coupled to the L2 cache while permitting new non-blocking transactions to enter the pipeline. Blocking transactions include read transactions and non-victim write transactions. Non-blocking transactions include response transactions, snoop transactions, and victim transactions. The method further includes, in response to an indication that the pipeline does not contain any pending blocking transactions, preventing new snoop transactions from entering the pipeline while permitting new response transactions and victim transactions to enter the pipeline; in response to an indication that the pipeline does not contain any pending snoop transactions, preventing, all new transactions from entering the pipeline; and, in response to an indication that the pipeline does not contain any pending transactions, performing the global operation on the L2 cache.

In accordance with another example of the disclosure, an apparatus includes a central processing unit (CPU) core and a level one (L1) cache subsystem coupled to the CPU core. The L1 cache subsystem includes a L1 cache, a L1 controller, and a level two (L2) cache subsystem coupled to the L1 cache subsystem. The L2 cache subsystem includes a L2 cache and a L2 controller. The L2 controller is configured to receive a request to perform a global operation on the L2 cache and prevent new blocking transactions from entering a pipeline coupled to the L2 cache and permit new non-blocking transactions to enter the pipeline. Blocking transactions include read transactions and non-victim write transactions. Non-blocking transactions include response transactions, snoop transactions, and victim transactions. The L2 controller is further configured to, in response to an indication that the pipeline does not contain any pending blocking transactions, prevent new snoop transactions from entering the pipeline and permit new response transactions and victim transactions to enter the pipeline; in response to an indication that the pipeline does not contain any pending snoop transactions, prevent all new transactions from entering the pipeline; and, in response to an indication that the pipeline does not contain any pending transactions, perform the global operation on the L2 cache.

In accordance with yet another example of the disclosure, a level two (L2) cache subsystem includes a L2 cache and a L2 controller. The L2 controller is configured to receive a request to perform a global operation on the L2 cache and prevent new blocking transactions from entering a pipeline coupled to the L2 cache and permit new non-blocking transactions to enter the pipeline. Blocking transactions include read transactions and non-victim write transactions. Non-blocking transactions include response transactions, snoop transactions, and victim transactions. The L2 controller is further configured to, in response to an indication that the pipeline does not contain any pending blocking transactions, prevent new snoop transactions from entering the pipeline and permit new response transactions and victim transactions to enter the pipeline; in response to an indication that the pipeline does not contain any pending snoop transactions, prevent all new transactions from entering the pipeline; and, in response to an indication that the pipeline does not contain any pending transactions, perform the global operation on the L2 cache.

BRIEF DESCRIPTION OF THE DRAWINGS

For a detailed description of various examples, reference will now be made to the accompanying drawings in which:

FIG. 4 shows a block diagram of a multi-stage pipeline in accordance with various examples;

FIG. 7 is a flow chart of a method for stalling a cache pipeline to perform a global operation in accordance with various examples;

FIG. 8a shows an example of improving cache allocation in response to a write allocate in accordance with various examples;

FIG. 8b shows an example of register files used in FIG. 8a in accordance with various examples;

FIG. 9 shows a flow chart of a method of improving cache allocation in response to a write allocate in accordance with various examples;

FIG. 11 shows a flow chart of an alternate way selection policy using a random number generator in accordance with various examples;

FIG. 12 shows a flow chart of operating a cache controller in caching and non-caching modes in accordance with various examples;

FIG. 14 shows a flow chart of a method for performing aliased and un-aliased memory operations in accordance with various examples.

DETAILED DESCRIPTION

Figures 1, 3:
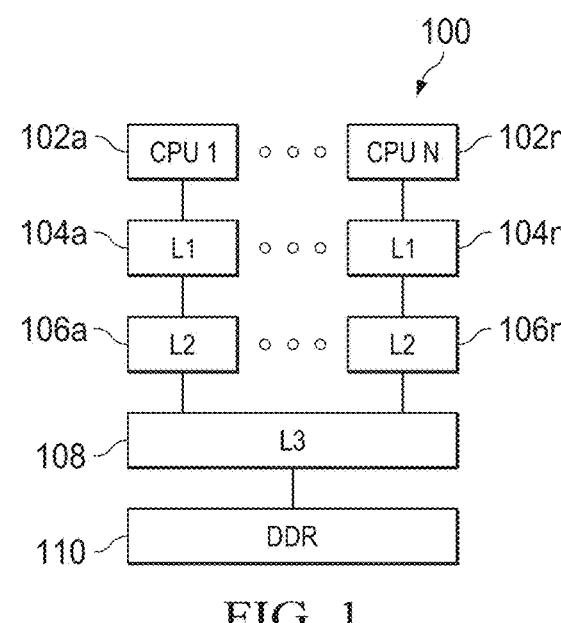
FIG. 1 shows a block diagram of a multi-level cache system in accordance with various examples.
FIG. 3 shows another block diagram of a multi-level cache system including level one (L1) main and victim caches in accordance with various examples.

FIG. 1 shows a block diagram of a system 100 in accordance with an example of this disclosure. The example system 100 includes multiple CPU cores 102a-102n. Each CPU core 102a-102n is coupled to a dedicated L1 cache 104a-104n and a dedicated L2 cache 106a-106n. The L2 caches 106a-106n are, in turn, coupled to a shared third level (L3) cache 108 and a shared main memory 110 (e.g., double data rate (DDR) random-access memory (RAM)). In other examples, a single CPU core 102 is coupled to a L1 cache 104, a L2 cache 106, a L3 cache 108, and main memory 110.

In some examples, the CPU cores 102a-102n include a register file, an integer arithmetic logic unit, an integer multiplier, and program flow control units. In an example, the L1 caches 104a-104n associated with each CPU core 102a-102n include a separate level one program cache (L1P) and level one data cache (L1D). The L2 caches 106a-106n are combined instruction/data caches that hold both instructions and data. In certain examples, a CPU core 102a and its associated L1 cache 104a and L2 cache 106a are formed on a single integrated circuit.

The CPU cores 102a-102n operate under program control to perform data processing operations upon data. Instructions are fetched before decoding and execution. In the example of FIG. 1, L1P of the L1 cache 104a-104n stores instructions used by the CPU cores 102a-102n. A CPU core 102 first attempts to access any instruction from L1P of the L1 cache 104. L1D of the L1 cache 104 stores data used by the CPU core 102. The CPU core 102 first attempts to access any required data from L1 cache 104. The two L1 caches 104 (L1P and L1D) are backed by the L2 cache 106, which is a unified cache (e.g., includes both data and instructions). In the event of a cache miss to the L1 cache 104, the requested instruction or data is sought from L2 cache 106. If the requested instruction or data is stored in the L2 cache 106, then it is supplied to the requesting L1 cache 104 for supply to the CPU core 102. The requested instruction or data is simultaneously supplied to both the requesting cache and CPU core 102 to speed use.

The unified L2 cache 106 is further coupled to a third level (L3) cache 108, which is shared by the L2 caches 106a-106n in the example of FIG. 1. The L3 cache 108 is in turn coupled to a main memory 110. As will be explained in further detail below, memory controllers facilitate communication between various ones of the CPU cores 102, the L1 caches 104, the L2 caches 106, the L3 cache 108, and the main memory 110. The memory controller(s) handle memory centric functions such as cacheability determination, cache coherency implementation, error detection and correction, address translation and the like. In the example of FIG. 1, the CPU cores 102 are part of a multiprocessor system, and thus the memory controllers also handle data transfer between CPU cores 102 and maintain cache coherence among CPU cores 102. In other examples, the system 100 includes only a single CPU core 102 along with its associated L1 cache 104 and L2 cache 106.

Figure 2:
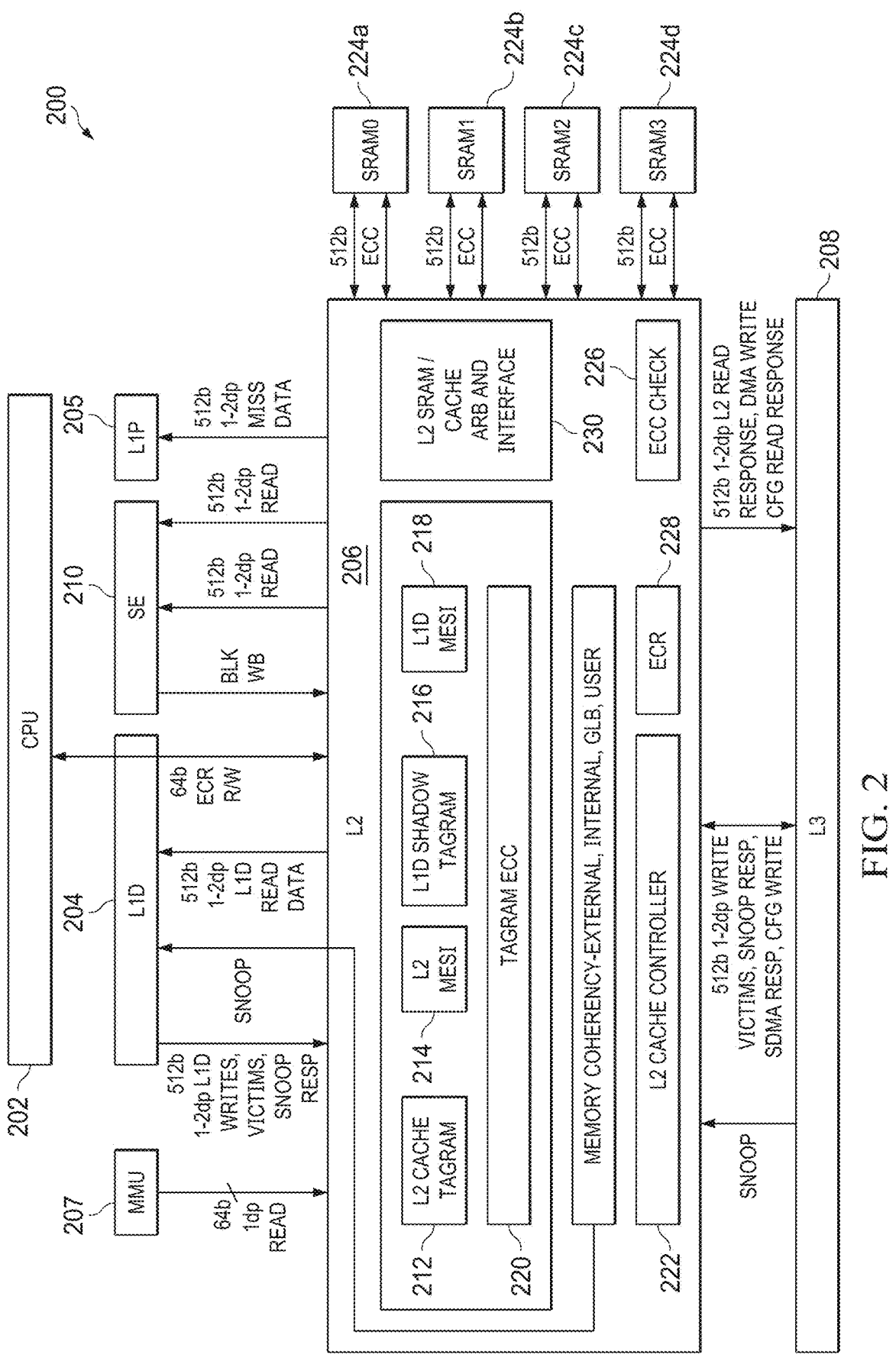
FIG. 2 shows another block diagram of a multi-level cache system in accordance with various examples.

FIG. 2 shows a block diagram of a system 200 in accordance with examples of this disclosure. Certain elements of the system 200 are similar to those described above with respect to FIG. 1, although shown in greater detail. For example, a CPU core 202 is similar to the CPU core 102 described above. The L1 cache 104 subsystem described above is depicted as L1D 204 and L1P 205. The L2 cache 106 described above is shown here as L2 cache subsystem 206. An L3 cache 208 is similar to the L3 cache 108 described above. The system 200 also includes a streaming engine 210 coupled to the L2 cache subsystem 206. The system 200 also includes a memory management unit (MMU) 207 coupled to the L2 cache subsystem 206.

The L2 cache subsystem 206 includes L2 tag ram 212, L2 coherence (e.g., Modified, Exclusive, Shared, Invalid ("MESI")) data memory 214, shadow L1 tag ram 216, and L1 coherence (e.g., MESI) data memory 218. Each of the blocks 212, 214, 216, 218 are alternately referred to as a memory or a RAM. The L2 cache subsystem 206 also includes tag ram error correcting code (ECC) data memory 220. In an example, the ECC data memory 220 is maintained for each of the memories 212, 214, 216, 218.

The L2 cache subsystem 206 includes L2 controller 222, the functionality of which will be described in further detail below. In the example of FIG. 2, the L2 cache subsystem 206 is coupled to memory (e.g., L2 SRAM 224) including four banks 224a-224d. An interface 230 performs data arbitration functions and generally coordinates data transmission between the L2 cache subsystem 206 and the L2 SRAM 224, while an ECC block 226 performs error correction functions. The L2 cache subsystem 206 includes one or more control or configuration registers 228.

In the example of FIG. 2, the L2 SRAM is depicted as four banks 224a-224d. However, in other examples, the L2 SRAM includes more or fewer banks, including being implemented as a single bank. The L2 SRAM 224 serves as the L2 cache and is alternately referred to herein as L2 cache 224.

The L2 tag ram 212 includes a list of the physical addresses whose contents (e.g., data or program instructions) have been cached to the L2 cache 224. In an example, an address translator translates virtual addresses to physical addresses. In one example, the address translator generates the physical address directly from the virtual address. For example, the lower n bits of the virtual address are used as the least significant n bits of the physical address, with the most significant bits of the physical address (above the lower n bits) being generated based on a set of tables configured in main memory. In this example, the L2 cache 224 is addressable using physical addresses. In certain examples, a hit/miss indicator from a tag ram 212 look-up is stored in a memory.

The L2 MESI memory 214 maintains coherence data to implement full MESI coherence with L2 SRAM 224, external shared memories, and data cached in L2 cache from other places in the system 200. The functionalities of system 200 coherence are explained in further detail below.

The L2 cache subsystem 206 also tracks or shadows L1D tags in the L1D shadow tag ram 216 and L1D MESI memory 218. The tag ram ECC data 220 provides error detection and correction for the tag memories and, additionally, for one or both of the L2 MESI memory 214 and the L1D MESI memory 218. The L2 cache controller 222 controls the operations of the L2 cache subsystem 206, including handling coherency operations both internal to the L2 cache subsystem 206 and among the other components of the system 200.

FIG. 3 shows a block diagram of a system 300 that demonstrates various features of cache coherence implemented in accordance with examples of this disclosure. The system 300 contains elements similar to those described above with respect to FIGS. 1 and 2. For example, the CPU core 302 is similar to the CPU cores 102, 202. FIG. 3 also includes a L1 cache subsystem 304, a L2 cache subsystem 306, and an L3 cache subsystem 308. The L1 cache subsystem 304 includes a L1 controller 310 coupled to a L1 SRAM 312. The L1 controller 310 is also coupled to a L1 main cache 314 and a L1 victim cache 316, which are explained in further detail below. In some examples, the L1 main and victim caches 314, 316 implement the functionality of L1D 204 and/or L1P 205.

The L1 controller 310 is coupled to a L2 controller 320 of the L2 cache subsystem 306. The L2 controller 320 also couples to L2 SRAM 322. The L2 controller 320 couples to a L2 cache 324 and to a shadow of the L1 main cache 326 as well as a shadow of the L1 victim cache 328. L2 cache 324 and L2 SRAM 322 are shown separately for ease of discussion, although may be implemented physically together (e.g., as part of L2 SRAM 224, including in a banked configuration, as described above. Similarly, the shadow L1 main cache 326 and the shadow L1 victim cache 328 may be implemented physically together, and are similar to the L1D shadow tag ram 216 and the L1D MESI 218, described above. The L2 controller 320 is also coupled to a L3 controller 309 of the L3 cache subsystem 308. L3 cache and main memory (e.g., DDR 110 described above) are not shown for simplicity.

Cache coherence is a technique that allows data and program caches, as well as different requestors (including requestors that do not have caches) to determine the most current data value for a given address in memory. Cache coherence enables this coherent data value to be determined by observers (e.g., a cache or requestor that issues commands to read a given memory location) present in the system 300. Certain examples of this disclosure refer to an exemplary MESI coherence scheme, in which a cache line is set to one of four cache coherence states: modified, exclusive, shared, or invalid. Other examples of this disclosure refer to a subset of the MESI coherence scheme, while still other examples include more coherence states than the MESI coherence scheme. Regardless of the coherence scheme, cache coherence states for a given cache line are stored in, for example, the L2 MESI memory 214 described above.

A cache line having a cache coherence state of modified indicates that the cache line is modified with respect to main memory (e.g., DDR 110), and the cache line is held exclusively in the current cache (e.g., the L2 cache 324). A modified cache coherence state also indicates that the cache line is explicitly not present in any other caches (e.g., L1 or L3 caches).

A cache line having a cache coherence state of exclusive indicates that the cache line is not modified with respect to main memory (e.g., DDR 110), but the cache line is held exclusively in the current cache (e.g., the L2 cache 324). An exclusive cache coherence state also indicates that the cache line is explicitly not present in any other caches (e.g., L1 or L3 caches).

A cache line having a cache coherence state of shared indicates that the cache line is not modified with respect to main memory (e.g., DDR 110). A shared cache state also indicates that the cache line may be present in multiple caches (e.g., caches in addition to the L2 cache 324).

A cache line having a cache coherence state of invalid indicates that the cache line is not present in the cache (e.g., the L2 cache 324).

Examples of this disclosure leverage hardware techniques, control logic, and/or state information to implement a coherent system. Each observer can issue read requests—and certain observers are able to issue write requests—to memory locations that are marked shareable. Caches in particular can also have snoop requests issued to them, requiring their cache state to be read, returned, or even updated, depending on the type of the snoop operation. In the exemplary multi-level cache hierarchy described above, the L2 cache subsystem 306 is configured to both send and receive snoop operations. The L1 cache subsystem 304 receives snoop operations, but does not send snoop operations. The L3 cache subsystem 308 sends snoop operations, but does not receive snoop operations. In examples of this disclosure, the L2 cache controller 320 maintains state information (e.g., in the form of hardware buffers, memories, and logic) to additionally track the state of coherent cache lines present in both the L1 main cache 314 and the L1 victim cache 316. Tracking the state of coherent cache lines enables the implementation of a coherent hardware cache system.

Examples of this disclosure refer to various types of coherent transactions, including read transactions, write transactions, snoop transactions, victim transactions, and cache maintenance operations (CMO). These transactions are at times referred to as reads, writes, snoops, victims, and CMOs, respectively.

Reads return the current value for a given address, whether that value is stored at the endpoint (e.g., DDR 110), or in one of the caches in the coherent system 300. Writes update the current value for a given address, and invalidate other copies for the given address stored in caches in the coherent system 300. Snoops read or invalidate (or both) copies of data stored in caches. Snoops are initiated from a numerically-higher level of the hierarchy to a cache at the next, numerically-lower level of the hierarchy (e.g., from the L2 controller 320 to the L1 controller 310), and are able be further propagated to even lower levels of the hierarchy as needed. Victims are initiated from a numerically-lower level cache in the hierarchy to the next, numerically-higher level of the cache hierarchy (e.g., from the L1 controller 310 to the L2 controller 320). Victims transfer modified data to the next level of the hierarchy. In some cases, victims are further propagated to numerically-higher levels of the cache hierarchy (e.g., if the L2 controller 310 sends a victim to the L2 controller 320 for an address in the DDR 110, and the line is not present in the L2 cache 324, the L2 controller 320 forwards the victim to the L3 controller 309). Finally, CMOs cause an action to be taken in one of the caches for a given address.

Still referring to FIG. 3, in one example, the L1 main cache 314 is a direct mapped cache that services read and write hits and snoops. The L1 main cache 314 also keeps track of cache coherence state information (e.g., MESI state) for its cache lines. In an example, the L1 main cache 314 is a read-allocate cache. Thus, writes that miss the L1 main cache 314 are sent to L2 cache subsystem 306 without allocating space in the L1 main cache 314. In the example where the L1 main cache 314 is direct mapped, when a new allocation takes place in the L1 main cache 314, the current line in the set is moved to the L1 victim cache 316, regardless of whether the line is clean (e.g., unmodified) or dirty (e.g., modified).

In an example, the L1 victim cache 316 is a fully associative cache that holds cache lines that have been removed from the L1 main cache 314, for example due to replacement. The L1 victim cache 316 holds both clean and dirty lines. The L1 victim cache 316 services read and write hits and snoops. The L1 victim cache 316 also keeps track of cache coherence state information (e.g., MESI state) for its cache lines. When a cache line in the modified state is replaced from the L1 victim cache 316, that cache line is sent to the L2 cache subsystem 306 as a victim.

As explained above, the L2 cache subsystem 306 includes a unified L2 cache 324 that is used to service requests from multiple requestor types, including L1D and L1P (through the L1 controller 310), the streaming engine 210, a memory management unit (MMU 207), and the L3 cache (through the L3 controller 309). In an example, the L2 cache 324 is non-inclusive with the L1 cache subsystem 304, which means that the L2 cache 324 is not required to include all cache lines stored in the L1 caches 314, 316, but that some lines may be cached in both levels. Continuing this example, the L2 cache 324 is also non-exclusive, which means that cache lines are not explicitly prevented from being cached in both the L1 and L2 caches 314, 316, 324. For example, due to allocation and random replacement, cache lines may be present in one, both, or neither of the L1 and L2 caches. The combination of non-inclusive and non-exclusive cache policies enables the L2 controller 320 to manage its cache contents without requiring the L1 controller 310 to invalidate or remove cache lines. This simplifies processing in the L2 cache subsystem 306 and enables increased performance for the CPU core 302 by allowing critical data to remain cached in the L1 cache subsystem 304 even if it has been evicted from the L2 cache 324.

In accordance with examples of this disclosure, the L2 cache subsystem 306 includes a control pipeline that processes transactions of different types. In certain examples in this disclosure, transactions are classified as blocking or non-blocking, for example based on whether a receiving device is permitted to delay or stall the transaction. Examples of blocking transactions include read and write requests and instruction fetches. Examples of non-blocking transactions include victims, snoops, and responses to read and/or write requests. Still referring to FIG. 3, the L2 controller 320 described herein combines both local coherence (e.g., handling requests targeting its local L2 SRAM 322 as an endpoint) and external coherence (e.g., handling requests targeting external memories, such as L3 SRAM (not shown for simplicity) or DDR 110 as endpoints). An endpoint refers to a memory target such as L2 SRAM 322 or DDR 110 that resides at a particular location on the chip, is acted upon directly by a single controller and/or interface, and may be cached at various levels of a coherent cache hierarchy, such as depicted in FIG. 3. A master (e.g., a hardware component, circuitry, or the like) refers to a requestor that issues read and write accesses to an endpoint. In some examples, a master stores the results of these read and write accesses in a cache, although the master does not necessarily store such results in a cache.

In an example, an endpoint (e.g., the L3 cache subsystem 308 for cache transactions originating from the L2 controller 320, and the L1 cache subsystem 304 for snoop transactions originating from the L2 controller 320) will not stall non-blocking transactions behind another blocking transaction. As a result, non-blocking transactions are guaranteed to be consumed by the endpoint. Blocking transactions, however, can be stalled indefinitely by the endpoint. The L2 controller 320 sends both blocking and non-blocking transactions to both the L3 controller 309 and the L1 controller 310. If the L2 controller 320 has a blocking transaction to be sent out, but that is stalled, then a pipeline controller (e.g., arbitration logic) ensures that a non-blocking transaction can bypass the stalled blocking transaction and be sent out to the endpoint. As one example, the L2 pipeline is filled with reads from the streaming engine 205, which are blocking transactions. The L3 controller 309 is able to stall such streaming reads. However, if the L1 controller 310 needs to send a victim to the L2 controller, or if the L2 controller 320 needs to respond to a snoop from the L3 controller 309, examples of this disclosure permit such non-blocking transactions to be sent out through the same control pipeline.

Figure 4:
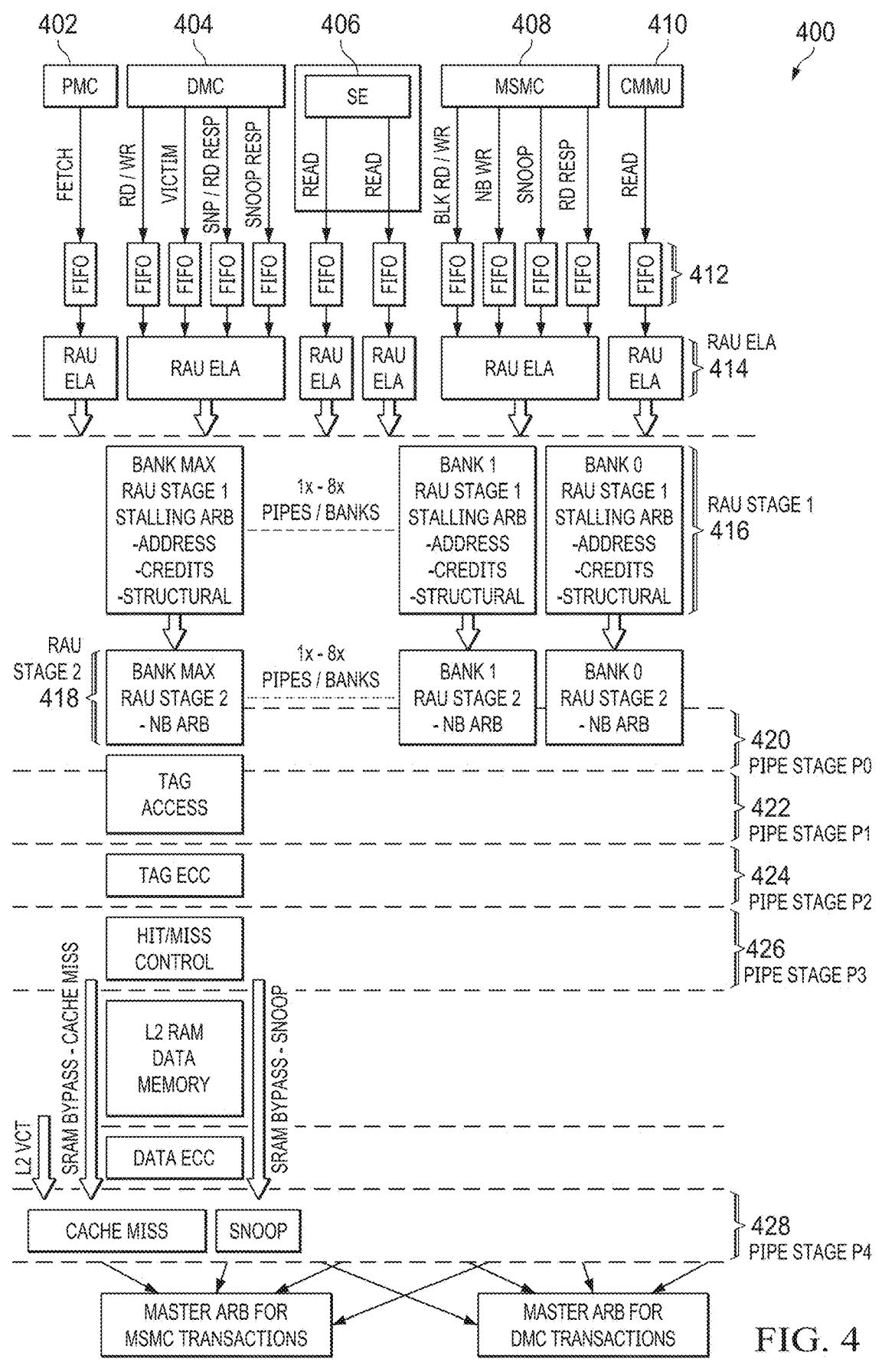

FIG. 4 shows a pipeline 400 of the L2 cache subsystem 306 in accordance with examples of this disclosure. Certain examples of this disclosure pertain particularly to transaction arbitration carried out in pipe stage P4 428. However, the pipeline 400 is described below for additional context and clarity. The pipeline 400 receives transactions from various masters, such as program memory controller 402 (e.g., PMC or L1P 205), data memory controller 404 (e.g., DMC or L1D 204), a streaming engine 406 (e.g., SE 210), a multicore shared memory controller 408 (e.g., MSMC or L3 controller 309), and a memory management unit 410 (e.g., MMU 207). A plurality of FIFOs 412 contain different types of transactions from the various masters 402, 404, 406, 408, 410, while a resource allocation unit (RAU) 414, 416, 418 arbitrates transactions from each requestor, for example based on the particular type of requestor and the type of transactions that can originate from that requestor. For purposes of this disclosure, transactions are classified as blocking and non-blocking.

The RAU stages 414, 416, 418 arbitrate among different transaction types, which have certain characteristics. For example, blocking reads and writes include data loads and stores, code fetches, and SE 406 reads. These blocking transactions can stall behind a non-blocking transaction or a response. Another example includes non-blocking writes, which include DMC 404 victims (either from a local CPU core or from a different CPU core cached by the DMC 404). These types of transactions are arbitrated with other non-blocking and response transactions based on coherency rules. Another example includes non-blocking snoops, which are snoops from MSMC 408 that are arbitrated with other non-blocking and response transactions based on coherency rules. Another example includes responses, such as to a read or cache line allocate transaction sent out to MSMC 408, or for a snoop sent to DMC 404. In both case, responses are arbitrated with other non-blocking and response transactions based on coherency rules. Finally, DMA transactions are possible, which are generally allowed to stall behind other non-blocking or blocking transactions.

Not all requestors originate all these types of transactions. For example, DMC 404 can originate blocking reads, blocking writes, non-blocking writes (e.g., DMC 404 victims), non-blocking snoop responses, and non-blocking DMA response (e.g., for L1D 204 SRAM). For the DMC 404, non-blocking transactions win arbitration over blocking transactions. Between the various non-blocking transactions, non-blocking commands are processed in the order that they arrive. DMA responses are for accesses to L1D 204 SRAM and do not necessarily follow any command ordering.

An example PMC 402 can originate only blocking reads. In one example, reads from PMC 402 are processed in order.

An example SE 406 can originate blocking reads and CMOs. In one example, reads and CMO accesses from SE 406 are processed in order.

An example MMU 410 can originate only blocking reads. In one example, reads from MMU 410 are processed in order.

Finally, an example MSMC 408 can originate blocking DMA reads, blocking DMA writes, non-blocking writes (e.g., L1D 204 victims from another CPU core), non-blocking snoops, and non-blocking read responses. For MSMC 408, non-blocking transactions win arbitration over blocking transactions. Arbitration between non-blocking transactions depends on ordering required for keeping memory coherent. However, in an example, read responses are arbitrated in any order, since there is no hazard between read responses.

Stages P0 (420) through P3 (426) are non-stalling and non-blocking. The non-stalling nature means that a transaction does not stall in these pipeline stages. In an example, transactions take either 1 or 2 cycles, has guaranteed slots in the following pipeline stage. The non-blocking nature relies on the fact that the arbitration before P0 420 has guaranteed that a FIFO entry is available for the transaction entering P0 420, and for any secondary transactions that it may generate.

The stage P0 420 generally performs a credit management function, in which credits are "consumed" by certain transactions based on the transaction type. These consumed credits are released later in the pipeline 400. The concept of credits is one exemplary approach to ensuring that transactions are allowed to advance only when the have a memory element to land in a later pipe stage, which ensures the non-blocking characteristics of the pipeline. However, other examples do not necessarily rely on credits, but employ other methods to ensure that transactions are allowed to advance only when there is sufficient pipeline space to allow the transaction to proceed through the pipeline stage(s) that are non-blocking.

The stage P0 420 along with stages P1 422 and P2 424 perform various cache and SRAM functionality, such as setting up reads to various caches, performing ECC detection and/or correction for various caches, and determining cache hits and misses. The stage P3 426 performs additional cache hit and miss control, and also releases credits for certain transaction types.

Figure 5:
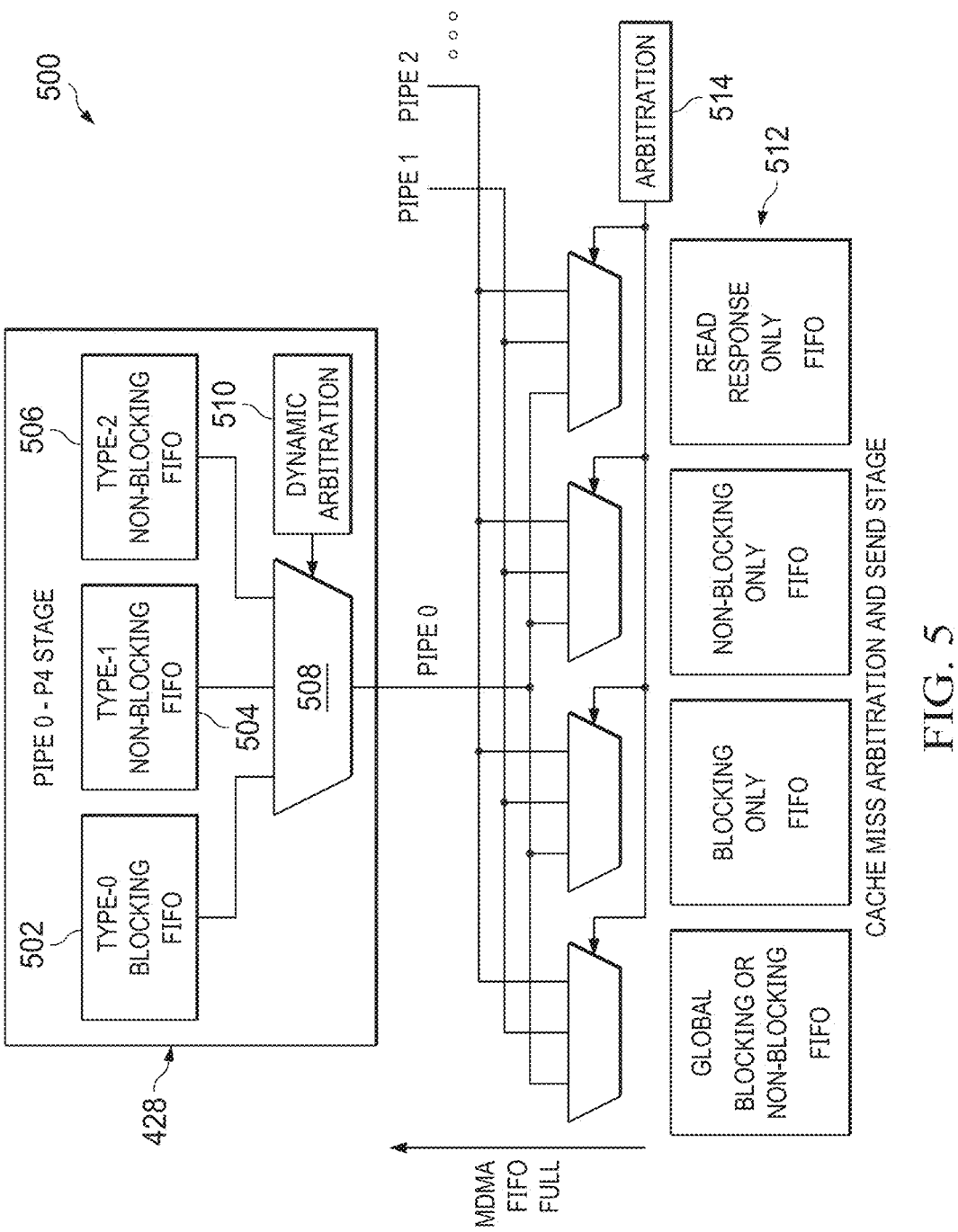
FIG. 5 shows a block diagram of a P4 stage of the pipeline including transaction arbitration in accordance with various examples.

Examples of this disclosure are directed to dynamic arbitration of various transactions in the pipeline stage P4 428 and the cache miss arbitration and send stage, which is described in further detail below. Referring to FIG. 5, a system 500 is shown that includes an exemplary P4 stage 428 from one of the pipelines 400. Although not shown for simplicity, it should be appreciated that the other pipelines contain a similar P4 stage that functions in a manner similar to the P4 stage 428 described below. As shown, the P4 stage 428 includes FIFOs for various transaction types. For example, the P4 stage 428 includes a FIFO for type 0 blocking transitions 502, a FIFO for type 1 non-blocking transactions 504, and a FIFO for type 2 non-blocking transactions 506. The specific transaction types are explained in further detail below. The output of each FIFO 502, 504, 506 is input to a multiplexer 508, which is controlled by a dynamic arbitration state machine 510, which will also be explained in further detail below. The output of each P4 stage 428 is made available to various FIFOs 512 of the cache miss arbitration and send stage, which is a single stage where transactions from all pipes are arbitrated, multiplexed and sent out from the L2 cache subsystem 306, for example to the L3 cache subsystem 308.

The FIFO 502 receives type 0 transactions from the previous pipe stages, which include all blocking read and write transactions. The FIFO 504 receives type 1 transactions from the previous pipe stages, which include non-blocking victims or snoop responses from L1D 204. The FIFO 506 receives type 2 transactions from the previous pipe stages, which include non-blocking L2 victims or snoop responses that hit the L2 cache 324.

As explained, the cache miss arbitration and send stage is a stage that handles transactions from all pipes. Transactions from any pipe that are intended for the L3 cache subsystem 308 are arbitrated in this stage. In an example, this arbitration is isolated and independent from the transactions from every pipe that are intended for the L1 cache subsystem 304. The cache miss arbitration and send stage evaluates the type and number of credits required to send a particular transaction out to the L3 cache subsystem 308 endpoint based on the transaction type, and arbitrates one transaction from the pipes that can go out (e.g., using arbitration logic 514 to control entry into the various FIFOs 512).

In one example of the cache miss arbitration and send stage, the output FIFOs 512 include different structures having variable, configurable depths. In this example, the global FIFO can accept blocking and non-blocking transactions. The blocking FIFO can accept cache allocates and blocking read and write transactions. A blocking transaction is pushed into the blocking FIFO when the global FIFO is full. The non-blocking FIFO can accept snoop responses and L1 cache subsystem 304 and L2 cache subsystem 306 victims. A non-blocking transaction is pushed into the non-blocking FIFO when the global FIFO is full. Transactions are released from the FIFOs 512, for example, based on interactions with the L3 cache subsystem 308 that indicate whether and/or how much transaction processing bandwidth is available in the L3 cache subsystem 308, and for what types of transactions (e.g., a credit-based scheme). The read response FIFO is used for DMA read responses, which are released to the L3 cache subsystem 308 on a DMA thread.

In an example, a FIFO full signal is sent from the output FIFOs 512 to the P4 stage 428. In one example, the FIFO full signal actually includes a separate signal for each of the FIFOs 512. These separate signals are asserted when the corresponding FIFO 512 is full, and de-asserted when the corresponding FIFO 512 is not full. As will be explained further below, this insight into the status of the FIFOs 512 in the next stage allows the dynamic arbitration state machine 510 of the P4 stage 428 to more efficiently arbitrate among various transactions (e.g., type 0, type 1, type 2).

In particular, the FIFO full signal indicates that the FIFO(s) 512 that a transaction (e.g., being considered by the dynamic arbitration state machine 510) is trying to advance to has no empty slots. The state machine 510 monitors the specific signal(s) of the FIFO full signal for the FIFO(s) 512 to which it could advance a transaction. In examples where a transaction comprises two data phases, explained further below, the FIFO full signal indicates the availability of two data slots in the FIFO(s) 512.

In accordance with examples of this disclosure, the dynamic arbitration state machine 510 of the P4 stage 428 monitors the transactions from the previous stage P3 426, as well as the availability of the FIFOs 512 (e.g., through the FIFO full signals). As explained, the previous stage P3 426 can send transactions of type 2, type 1, or type 0 to the P4 stage 428. Type 2 transactions have the highest priority, while type 0 transactions have the lowest priority, based on the blocking and non-blocking rules explained above.

Figure 6:
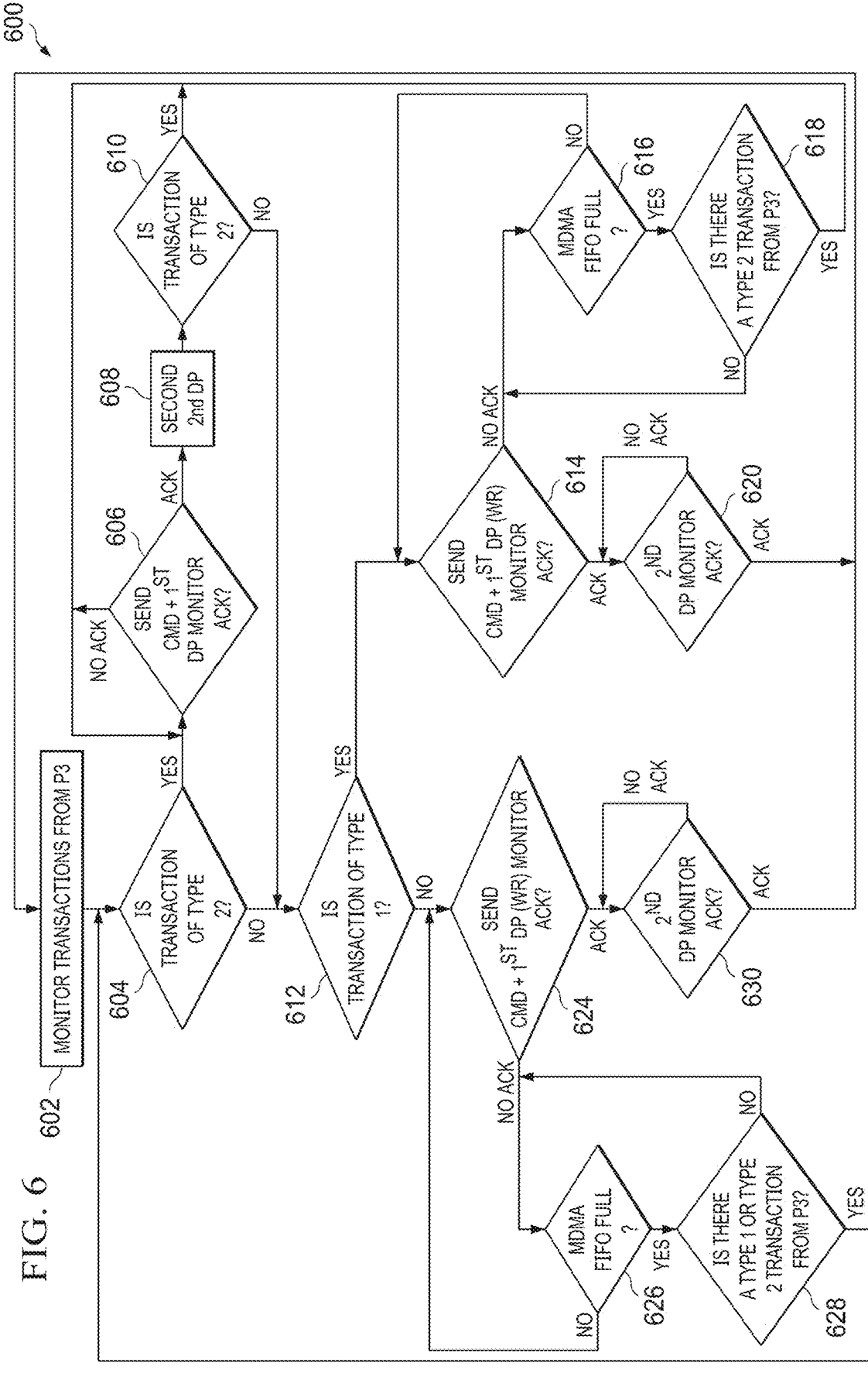
FIG. 6 is a flow chart of a method for transaction arbitration in accordance with various examples.

FIG. 6 shows a flow chart 600 of the operation of the dynamic arbitration state machine 510. The chart 600 (e.g., the state machine 510) begins in the state 602 in which the state machine 510 monitors transactions from stage P3 426. For example, the FIFOs 502, 504, 506 are initially empty, and thus when a transaction from stage P3 426 is received, the state machine 510 is aware of the transaction's presence in one of the FIFOs 502, 504, 506. When a transaction is received in one of the FIFOs 502, 504, 506, the state machine 510 proceeds to block 604 to determine whether the transaction is of a highest priority level (e.g., type 2 in the example above, in the FIFO 506). If a type 2 transaction is available, the state machine 510 proceeds to block 606.

In the example of FIG. 6, it is assumed that transactions are processed as two data phases (DP). For example, the unit of coherence for a cache line is 128 bytes, while a physical bus width is only 64 bytes (e.g., the data phase), and thus transactions are split into first and second data phases. In another example where transactions are single DP transactions, the state machine 510 is simplified by eliminating the need to send a second DP before again monitoring for new transactions from the FIFOs 502, 504, 506.

Since it is assumed that transactions are have two DPs, the state machine 510 proceeds to block 606 where the first DP and command is sent to be arbitrated for entry into the FIFOs 512. When the cache miss arbitration stage accepts the first DP, it transmits an ACK signal to the state machine 510. The state machine 510 waits to receive the ACK before proceeding to block 608 and sending the second DP to be arbitrated for entry into the FIFOs 512. In this example, the ACK arrives the cycle after the first DP and command is sent by the P4 stage 428 to the cache miss arbitration stage.

After the second DP is sent, the state machine 510 proceeds to block 610 to determine whether the transaction is of a highest priority level (e.g., type 2). If a type 2 transaction is available in the FIFO 506, the state machine 510 returns to block 606 and proceeds as explained above. As a result, as long as a type 2 transaction is available in the FIFO 506, the state machine 510 continues to give highest priority to those transactions.

However, if a type 2 transaction is not present in the FIFO 506 (either as determined in block 604 or block 610), the state machine proceeds to block 612 to determine whether a transaction is available in the FIFO 504 (e.g., is a type 1 transaction). If a type 1 transaction is available in the FIFO 504, the state machine 510 continues to block 614. As above, it is assumed that transactions are have two DPs, and so the state machine proceeds in block 614 to send the first DP and command to be arbitrated for entry into the FIFOs 512.

Unlike when processing a type 2 transaction having the highest priority, while no ACK is yet received, the state machine 510 proceeds to block 616 to check the FIFO full signal. As long as the FIFO full signal is not asserted (e.g., for the FIFO(s) 512 pertaining to the type 1 transaction), the state machine 510 returns to block 614 to continue to wait for an ACK. However, if the FIFO full signal is asserted, then there is no room in the FIFO(s) 512 pertaining to the type 1 transaction, and the state machine 510 continues to block 618 to determine whether a type 2 transaction is available in the FIFO 506. As above, if a lower-priority transaction cannot be completed (e.g., due to FIFOs 512 being full), the state machine 510 prioritizes the highest priority, type 2 transactions if available in the FIFO 506. If a type 2 transaction is available, the state machine 510 returns to block 606 to process the type 2 transaction as described above. If, in block 618, it is determined that a type 2 transaction is not available, the state machine 510 returns to block 616 to determine whether the FIFO full signal is still asserted.

The above-described loop between blocks 616, 614, and 618 continues until an ACK is received, at which point the state machine 510 proceeds from block 614 to block 620 and sends the second DP to be arbitrated for entry into the FIFOs 512. Once the second DP has been sent, the state machine 510 waits for an ACK in block 620 and proceeds back to block 602 to monitor the transactions in FIFOs 502, 504, 506.

Referring back to block 612, if a type 1 transaction is not available in the FIFO 504, then a transaction of type 0 is available in the FIFO 502 and the state machine 510 continues to block 624. As above, it is assumed that transactions are have two DPs, and so the state machine proceeds in block 624 to send the first DP and command to be arbitrated for entry into the FIFOs 512.

As above with processing a type 1 transaction, while no ACK is yet received, the state machine 510 proceeds to block 626 to check the FIFO full signal. As long as the FIFO full signal is not asserted (e.g., for the FIFO(s) 512 pertaining to the type 0 transaction), the state machine 510 returns to block 624 to continue to wait for an ACK. However, if the FIFO full signal is asserted, then there is no room in the FIFO(s) 512 pertaining to the type 0 transaction, and the state machine 510 continues to block 628 to determine whether a type 2 transaction is available in the FIFO 506 or a type 1 transaction is available in the FIFO 504. As above, if a lower-priority transaction cannot be completed (e.g., due to FIFOs 512 being full), the state machine 510 prioritizes the higher priority, type 2 transactions (if available in the FIFO 506) and type 1 transactions (if available in the FIFO 504). If a type 2 or type 1 transaction is available, the state machine 510 returns to block 604 to determine whether a type 2 or type 1 is available, and the state machine 510 operates as described above. If, in block 628, it is determined that a type 2 or type 1 transaction is not available, the state machine 510 returns to block 626 to determine whether the FIFO full signal is still asserted.

The above-described loop between blocks 626, 624, and 628 continues until an ACK is received, at which point the state machine 510 proceeds from block 624 to block 600 and sends the second DP to be arbitrated for entry into the FIFOs 512. Once the second DP has been sent, the state machine 510 waits for an ACK in block 630 and proceeds back to block 602 to monitor the transactions in FIFOs 502, 504, 506.

Thus, the dynamic arbitration state machine 510 prioritizes a higher-priority transaction frequently, to ensure that the inability of a lower-priority transaction to proceed to the next stage does not interfere with the processing of such higher-priority transactions.

Additionally, by checking the FIFO full signals during processing of various transactions, the state machine 510 remains aware of whether a particular transaction can proceed from the stage P4 428. For example, a transaction cannot proceed from the P4 stage 428 to the cache miss arbitration and send stage if FIFO full signal is asserted. The FIFO full signal being low indicates that the transaction being operated on by the dynamic arbitration state machine 510 will eventually be able to enter one of the FIFOs 512 (although in some cases it may be stalled temporarily). For example, if another pipeline's P4 stage is able to advance a transaction to the cache miss arbitration and send stage, then a FIFO 512 may become full, causing the FIFO full signal to be asserted. However, if the FIFO 512 has an available slot, the FIFO full signal remains de-asserted. Finally, if the state machine 510 is stalled, for example because the FIFO full signal is asserted, then the transaction cannot advance. If a transaction with a higher priority arrives, the state machine 510 switches to process the higher-priority transaction. The transaction that was being processed may be temporarily held, or parked (e.g., in a memory structure, which in some examples is different than the FIFOs 502, 504, 506, 512), until the state machine 510 has processed the higher-priority transaction, at which point the state machine 510 returns to process the lower priority transaction.

In the example of FIG. 6, it was assumed that transactions are processed as two data phases (DP), due to the data phase size being smaller than the transaction size. However, in other examples, transactions are processed as a single data phase, and thus blocks 608, 620, and 630 are removed from the state machine in FIG. 6. In another example, rather than having high, medium, and low priority transactions (e.g., type 2, type 1, and type 0 transactions, respectively), transactions are classified as either high priority or low priority. In this example, blocks 612 and 624-630 are removed from the state machine in FIG. 6. In yet another example, rather than having multiple input transaction buffers 502, 504, 506, these buffers are be condensed to fewer buffers, including in some examples a single buffer. Similarly, rather than having multiple output buffers 512, these buffers are condensed to fewer buffers, including in some examples a single buffer.

In examples of the present disclosure, global cache operations are pipelined to take advantage of the banked configuration of the L2 cache subsystem 306, explained above. A global cache operation is a transaction that operates on more than one cache line. In addition, the L2 controller 320 manages global cache operations on the L2 cache subsystem 306 to avoid encountering any blocking conditions during the global cache operation.

As explained, the L2 cache subsystem 306 includes multiple banks in some examples (e.g., banks 224a-224d shown above in FIG. 2). In certain examples, the number of banks is configurable. Each bank has an independent pipeline 400 associated therewith. Thus, the L2 controller 320 is configured to facilitate up to four transactions (in the example of FIG. 2) to the L2 cache 324 in parallel (e.g., one transaction per bank). In accordance with examples of this disclosure, this enables the L2 controller 320 to facilitate global coherence operations on the banks of the L2 cache 324 at the same time.

FIG. 7 shows a flow chart of a method 700 for stalling a pipeline of the L2 cache subsystem 306 (e.g., pipeline 400, described above) to perform a global cache operation in accordance with various examples of this disclosure. The method 700 begins in block 702, which is the start of the global operation state machine. In block 702, the L2 controller 320 receives a request to perform a global operation on the L2 cache 324. In some examples, the request is in the form of a program (e.g., executed by the CPU core 302) asserting a field in a control register, such as the ECR 228.

Various global cache operations are able to be requested of the L2 controller 320. In one example, the global cache operation is an invalidate operation, which invalidates each cache line in the L2 cache 324. In another example, the global operation is a writeback invalidate operation, in which dirty cache lines (e.g., having a coherence state of modified) in the L2 cache 324 are written back to their endpoint and subsequently invalidated. In yet another example, the global operation is a writeback operation, in which dirty cache lines in the L2 cache 324 are written back to their endpoint. The written back, dirty cache lines in the L2 cache 324 then have their coherence state updated to a shared cache coherence state. In some of these examples, the global operation comprises querying the cache coherence state of each line in the L2 cache 324 and updating the cache coherence state of each line in the L2 cache 324. For example, if the global operation is the writeback operation, after modified cache lines in the L2 cache 324 are written back to their endpoint, the L2 controller 320 queries the coherence state for the lines in the L2 cache 324 and updates the coherence state for modified cache lines to be shared.

Regardless of the type of global cache operation to be performed, for example as indicated in the request to the L2 controller 320 (e.g., based on an asserted field of a control register, such as ECR 228), the method 700 continues to block 704 in which the L2 controller 320 enforces a blocking soft stall. In the blocking soft stall phase, the L2 controller 320 stalls all new blocking transactions from entering the pipeline, while permitting non-blocking transactions including response transactions, non-blocking snoop, and victim transactions to be accepted into the pipeline and arbitrated.

In an example, multiple cycles are needed for the L2 controller 320 to flush its pipeline in the blocking soft stall phase 704. Thus, the method 700 continues in block 706 to determine whether all blocking transactions have been flushed from the pipeline. In response to an indication that the pipeline does not contain any more blocking transactions, the method 700 continues to block 708 in which the L2 controller 320 enforces a non-blocking soft stall. In the non-blocking soft stall phase, the L2 controller 320 stalls new snoop transactions from entering the pipeline, while permitting new response transactions and victim transactions to enter the pipeline. The non-blocking soft stall phase thus prevents new snoops from being initiated to the L1 controller 310 for lines previous cached in the L1 cache 314.

The method 700 continues in block 710 to determine whether all snoop transactions have been flushed from the pipeline. In response to an indication that the pipeline does not contain any more pending snoop transactions, the method 700 continues to block 712 in which the L2 controller 320 enforces a hard stall. In the hard stall phase, the L2 controller 320 prevents all new transactions from entering the pipeline, including response transactions.

In some examples, the L2 controller 320 de-asserts a ready signal during the soft and hard stall phases. De-asserting the ready signal indicates to the CPU core 302 not to send the L1 controller 310 additional requests for a global coherence operation or a cache size change. Thus, the L2 controller 320 is able to complete the pending global coherence operation while guaranteeing that additional global coherence operations will not be issued by the CPU core 302. The ready signal remains de-asserted until the global operation is completed.

The method continues in block 714 to determine whether all transactions have been flushed from the pipeline. In response to the L2 controller 320 determining that the pipeline does not contain any more pending transactions, the method 700 continues to block 716. The method 700 steps of 702 through 714 are performed by the L2 controller 320, for example, on each pipeline independently (e.g., as a state machine implemented for each pipeline) and in parallel. However, in block 716, the L2 controller 320 waits for confirmation from all pipelines that they have flushed all pending transactions (e.g., that all pipelines have proceeded to block 716). Once confirmation is received that all pipelines have flushed all pending transactions, the method 700 continues to block 718 where the global operation is performed. In an example, the global operation also proceeds independently, in parallel on each of the pipelines to the banked L2 cache 324. An application executing on the CPU core 302 that requested the global operation be performed (e.g., by asserting a field in a control register such as ECR 228) is also configured to poll the same field, which the L2 controller 320 is configured to de-assert upon completion of the global operation.

By stalling its pipelines in a phased manner as described above, the L2 controller 320 first avoids continuing to process transactions that could change the state of the L2 cache 324 (e.g., a read request that causes a change to the cache coherence state of a cache line). While the L2 cache 324 will not receive any more transactions that could change its state, the L2 controller 320 continues to process certain transactions that resulted from a transaction that occurred before the global operation was requested. For example, if the L1 controller 310 issued a victim to the L2 controller 320 as a result of a read before the global operation, the L2 controller 320 does not necessarily know what read request caused the victim from the L2 controller 310, and thus continues to process such victims (and snoop responses) as a safer approach. The L2 controller 320 does not continue to send out new transactions, because this could lead to a loop condition. Snoop transactions before the global operation continue to be processed (e.g., in block 710) and once those snoop transactions are processed, the L2 controller 320 has successfully stopped new transactions from being processed, and processed those transactions already in progress to completion. The parallel performance of a global operation thus enabled by the L2 controller 320 improves performance from the parallel nature of the banked L2 cache 324 and the parallel implementation of global operations.

A write request received from the CPU core 302 that can be cached in the L2 cache 324, but that misses the L2 cache 324, can be "write-allocated." Examples of this disclosure relate to certain improvements enabled by the L2 controller 320 and associated structures of the L2 cache subsystem 306 for such write allocate transactions.

In an example, the L2 cache subsystem 306 includes memory storage elements (e.g., buffers) that are used to service write allocate transactions. These are referred to as register files herein, although this disclosure should not be construed to be limited to a specific type of memory element. FIG. 8b, discussed further below, shows an example of register files used to service write allocate transactions.

When the L2 controller 320 determines to perform a write allocate (e.g., when a write request misses the L2 cache 324), the L2 controller 320 is configured to generate a read request to the address to be written to into the L2 cache subsystem 306. That is, rather than forward the write request to the L3 controller 309 or DDR 110, the L2 controller 320 is configured to bring the data to be written to into the L2 cache subsystem 306 to ultimately be stored in the L2 cache 324.

The write request received by the L2 controller 320 includes write data in a data field, and in some cases also includes an enable field, which specifies valid portions of the data field (e.g., those containing valid write data). The enable field is described further below. Regardless, in some cases, the L2 controller 320 allocates space in a register file for the data associated with the write request (e.g., the data field and possibly the enable field). Additionally, the L2 controller 320 allocates space in the register file for the read response that is expected to result from the read request that the L2 controller 320 issued as a result of the write allocate. When the read response is received, the L2 controller 320 writes the read response data to a line in the L2 cache 324 and then writes the write data to the same line in the L2 cache 324, completing the initial write request. However, this approach requires more storage in the register file and increases the number of transactions that are carried out to finally implement the write request.

In examples of this disclosure, the L2 controller 320 is configured to reserve an entry in a register file for read data returned in response to the read request that resulted from the write allocate transaction. The L2 controller 320 updates a data field of the reserved entry with the write data (e.g., the data field of the initial write request) and the L2 controller 320 updates an enable field of the reserved entry based on the write data. Then, when the read response is returned, the L2 controller 320 is configured to merge the returned read data into the data field of the reserved entry. The reserved entry is then written to the L2 cache 324. This reduces the space required in the register file to service such a write allocate transaction. Additionally, transactions to the L2 cache 324 are reduced since the merging occurs in the register file of the L2 cache subsystem 306.

FIG. 8a shows an example 800 of the above functionality, which enables the L2 controller 320 to improve cache allocation, particularly in response to a write request. The example 800 includes an initial snapshot of an entry in a register file after a write request has been received by the L2 controller 320 that misses the L2 cache 324. In this example 800, the write request is for address A. The write data includes x0A in a first portion 802 of the data field and x0B in a second portion 804 of the data field. In this example, the enable field comprises one bit per byte of data in the data field, which is asserted when the corresponding data field portion is valid. Thus, the enable field for the first and second portions 802, 804 is asserted. Conversely, the enable field for third and fourth portions 806, 808 is de-asserted, and thus the data fields in the third and fourth portions 806, 808 are irrelevant as invalid write data.

The example 800 also includes a later snapshot of the entry in the register file after a read response (e.g., a response to the read request that the write allocate transaction caused) has been received by the L2 controller 320. In this example 800, the data contained at address A is xCDEF9876. As explained above, the L2 controller 320 is configured to merge the write data with the read response in the entry. In particular, the valid write data (indicated by an asserted corresponding enable field) overwrites the read response data in portions 810 and 812, while the read response data that is not overwritten (due to a de-asserted corresponding enable field) remains in the entry in portions 814, 816. In particular, when a sub-field or portion of the enable field is asserted (e.g., portions 802 and 804), merging the write data with the read response in the entry includes discarding the read data. Similarly, when a sub-field or portion of the enable field is de-asserted (e.g., portions 806 and 808), merging the write data with the read response includes replacing the portion of the data field (e.g., a byte in the example 800) associated with the de-asserted sub-field with a corresponding portion of the read data (e.g., a byte in the example 800). Although not depicted, the read response can also be returned as mutually exclusive fragments, and thus merging is handled in a similar way.

FIG. 8b shows example register files 850 containing entries as described above. The example register files 850 are included in the L2 cache subsystem 306. In particular, the example 850 depicts the register files as schematically separate blocks including a write-allocate address FIFO 852, a write-allocate data FIFO 854, and a write-allocate enable FIFO 856. Although these are labeled as FIFOs, the structure of the register files is not necessarily a first-in, first-out structure in all examples. In accordance with the examples of this disclosure, write data is written to an entry in each of the FIFOs 852, 854, 856 when the L2 controller 320 generates the read request to the next level cache (e.g., the L3 cache subsystem 308). In this example, the write data includes the write-allocate address, which is written to the write-allocate address FIFO 852. The write data also includes the actual write data itself, which is written to the write-allocate data FIFO 854. Finally, the write data includes the enable data (e.g., one bit per byte of write data) that specifies whether a write data field is valid, which is written to the write-allocate enable FIFO 856. Upon the return of data from the address in the form of a read response (e.g., from the L3 cache subsystem 308), the read data is merged with the write data in the entry of the write-allocate data FIFO 854, for example based on the corresponding enable data in the write-allocate enable FIFO 856 as explained above with respect to FIG. 8a.

FIG. 9 shows a flow chart of a method 900 for improving cache allocation in response to a write request. The method 900 begins in block 902 with the L2 controller 320 receiving a write request for an address that is not allocated as a cache line in the L2 cache 324. The write request includes write data.

The method 900 continues in block 904 with the L2 controller 320 generating a read request for the address of the write request. The method 900 then continues in block 906 with reserving an entry in a register file for read data returned in response to the generated read request.

The method 900 continues further in blocks 908 and 910 with the L2 controller 320 updating a data field of the entry in the register file with the write data, and updating an enable field of the entry associated with the write data, respectively. As explained above, the enable field indicates the validity of a corresponding portion of the write data, and in the example of FIG. 8a comprises one bit per byte of write data. Finally, the method 900 concludes in block 912 with the L2 controller 320 receiving the read data and merging the read data into the data field of the entry, for example as described above with respect to FIG. 8a.

These improvements to write allocates in the L2 cache subsystem 306 reduce the space required in the register file to service such a write allocate transaction. Additionally, transactions to the L2 cache 324 are reduced because the merging occurs in the register file of the L2 cache subsystem 306.

The selection of a cache replacement algorithm can impact the performance of a cache subsystem, such as the L2 cache subsystem 306 explained above.

In an example, the L2 cache 324 is a read and write allocatable 8-way cache. The allocation of a cache line in the L2 cache 324 depends on various page attributes, cache mode settings, and the like. On detecting that a line is not present in the L2 cache 324 (e.g., a cache miss), the L2 controller 320 decides to allocate a line. For the sake of brevity, it is assumed that the L2 controller 320 is permitted to allocate the line upon the cache miss. The following examples explain how the L2 controller 320 allocates the line.

In some examples, the L2 controller 320 is configured to pipeline allocations to the L2 cache 324. As a result, the L2 controller 320 could end up in a situation where multiple cache line allocations are sent to the same way. Because response data can come out of order, this can cause data corruption, if multiple lines are allocated to the same way in the L2 cache 324. On the other hand, if multiple cache lines are to the same set, it is advantageous to avoid constraining the L2 controller 320 by the number of ways (8) to send the allocations out.

As explained above, each line in the L2 cache 324 comprises a coherence state (e.g., a MESI state, requiring 2 bits). Additionally, a secure or non-secure status (e.g., requiring 1 bit) of the line is tracked by the L2 controller 320. However, the security state of a line having a coherence state of invalid is not pertinent, and thus an additional cache line state is able to be tracked by the L2 controller 320 without requiring any additional replacement bit overhead. It is advantageous to reduce the replacement bit overhead employed by a particular replacement algorithm.

As one example, the following are possible coherence states for a line in the L2 cache 324:

"000": INVALID—Way is empty and available for allocation.

"001": PENDING—Way is empty, but has been marked for allocation

"010": SHARED_NON_SECURE—The line allocated to this way is in the Shared MESI state and is a non-secure line.

"011": SHARED_SECURE—The line allocated to this way is in the Shared MESI state and is a secure line.

"100": EXCLUSIVE_NON_SECURE—The line allocated to this way is in the Exclusive MESI state and is a non-secure line.

"101": EXCLUSIVE_SECURE—The line allocated to this way is in the Exclusive MESI state and is a secure line.

"110": MODIFIED_NON_SECURE—The line allocated to this way is in the Modified MESI state and is a non-secure line.

"111": MODIFIED_SECURE—The line allocated to this way is in the Modified MESI state and is a secure line As explained above, this enables Bit_0 of this status field to be used for both indicating that the line is pending, and as a secure bit if the line has already been allocated. This reduces the storage needed for holding this status information. For ease of explanation, pending is also considered a cache coherence state for purposes of describing the cache replacement polices below.

As used herein, pending refers to a situation where the L2 controller 320 has decided to allocate the line and has made a decision as to which way it will be allocated. This way is essentially locked to other allocates and stores the response data upon arrival. In accordance with examples of this disclosure, the L2 controller 320 leverages the pending bit to determine which of the ways are available for new allocations, which improves performance over a purely random cache replacement policy.

In accordance with examples of this disclosure, the L2 controller 320 employs a pseudo-random replacement policy. In the event that there is at least one way in a set that is available (e.g., having a cache coherence state of invalid), the L2 controller 320 is configured to pick that way for allocation. However, if all ways in the set have a cache coherence state of pending, the L2 controller 320 cannot select a way for allocation. Rather than stalling the transaction, the L2 controller 320 is configured to convert the transaction to a non-allocatable access and forwards the transaction to the endpoint (e.g., the L3 cache subsystem 308). As a result, the L2 controller 320 continues to pipeline out accesses without an unnecessary stall of transactions.

Figure 10:
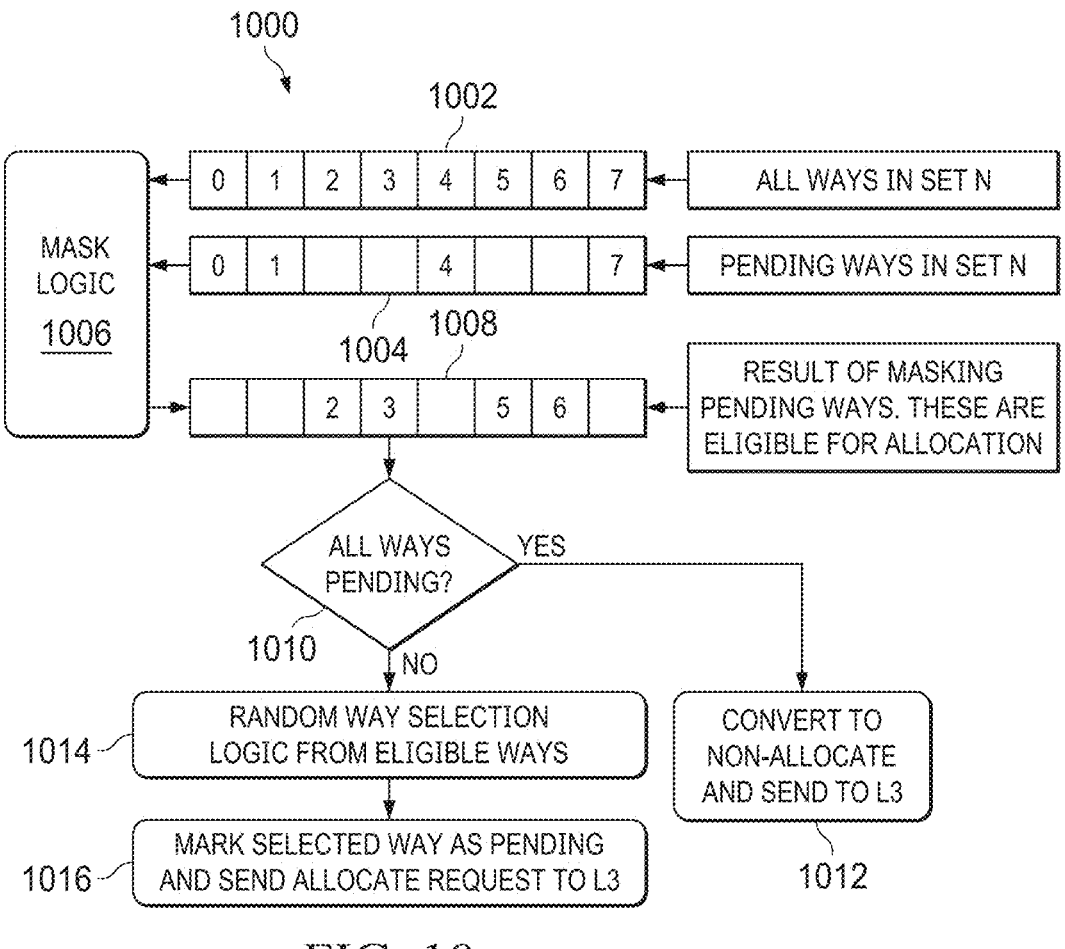
FIG. 10 shows an example and flow chart of a mask-based way selection policy using a random number generator in accordance with various examples.

Finally, if there are no empty (e.g., invalid) ways in the set, then the L2 controller 320 utilizes a random number generator to identify a way in the set. FIG. 10 shows an example 1000 of a mask-based way selection using the random number generator. In particular, the set includes eight ways as shown in block 1002. Block 1004 demonstrates that ways 0, 1, 4, and 7 have pending cache coherence states. Mask logic 1006 is applied to the blocks 1002 and 1004 to create a masked subset that includes the ways of the set that are not pending, which are ways 2, 3, 5, and 6 as shown in block 1008. If all ways are pending in block 1010, or the masked subset in block 1008 is empty, then the L2 controller 320 converts the transaction to a non-allocatable access (e.g., to the L3 controller 309) in block 1012, and as described above. However, if not all ways are pending in block 1014, then the L2 controller 320 applies the random number generator to select from the eligible ways in block 1008. In block 1016, the way selected in block 1014 has its cache state updated to pending and the L2 controller 320 sends an allocate request to, for example, the L3 controller 309.

FIG. 11 shows a flow chart of an alternate method 1100 of using the random number generator for way selection. The method 1100 begins in block 1102 with the L2 controller 320 receiving a first request to allocate a line in the L2 cache 324, which is an N-way set associative cache as explained. In response to a cache coherence state of a way indicating that a cache line stored in the way is invalid, the method 1100 continues in block 1104 with the L2 controller 320 allocating the way for the first request. This is similar to the behavior described above.

However, in response to no ways in the set having a cache coherence state indicating that the cache line stored in the way is invalid, the method 1100 continues in block 1106 with the L2 controller 320 using the random number generator to randomly select one of the ways in the set. In the method 1100, the random number generator is utilized without first masking pending ways, which reduces processing requirements. In response to a cache coherence state of the randomly selected way indicating that another request is not pending for the selected way (e.g., the randomly selected way has a coherence state other than pending), the method 1100 continues in block 1108 with the L2 controller allocating the selected way for the first request.

In the event that the randomly selected way in the method 1100 has a coherence state of pending, the L2 controller 320 can choose to service the first request without allocating a line in the L2 cache 324, for example by converting the first request to a non-allocating request and sending the non-allocating request to a memory endpoint identified by the first request. In other examples, upon the randomly selected way having a coherence state of pending, the L2 controller 320 is configured to randomly select another of the ways in the set. In some examples, the L2 controller 320 is configured to randomly re-select in this manner until the cache coherence state of the selected way does not indicate that another request is pending for the selected way. In other examples, the L2 controller 320 is configured to randomly re-select in this manner until a threshold number of random selections have been performed.

Regardless of the particular approach to random way selection employed, as described above, in the situation that the L2 controller 320 does not allocate the line (e.g., converts the request to a non-allocating request), performance is enhanced by not stalling the CPU core 302, and the L2 controller 320 continues sending accesses out to, for example, the L3 controller 309.

As explained above, the L3 cache subsystem 308 includes L3 SRAM, and in some examples of this disclosure the L3 SRAM address region exists outside of the L2 cache subsystem 306 and the CPU core 302 address space. Depending on performance requirements of various applications, the L3 SRAM address region is considered as shared L2 or L3 memory. One way to implement the L3 SRAM address region as shared L2 or L3 memory is to disable the ability of the L2 cache subsystem 306 to cache any address that mapped to the L3 SRAM address region. However, if an application does not need to use the L3 SRAM as shared L2 or L3 memory (e.g., to enable the L2 cache subsystem 306 to cache addresses in the L3 SRAM address region), the physical L3 SRAM region is mapped (e.g., through the MMU described above) to an external, virtual address. This mapping requires additional programming (e.g., of the MMU), and the L2 controller 320 has to manage different addresses mapping to the same physical L3 SRAM address region, which adds complexity for those applications that enable the L2 cache subsystem 306 to cache addresses in the L3 SRAM address region.

In accordance with examples of this disclosure, the L2 cache subsystem 306 includes a caching configuration register (e.g., a register or a field of ECR 228) that allows configurable control of whether the L2 cache subsystem 306 is able to cache addresses in the L3 SRAM address region. In some examples, the L3 SRAM includes multiple address regions, and the caching configuration register establishes whether each address region is cacheable or non-cacheable by the L2 cache subsystem 306. For simplicity, it is assumed that the L3 SRAM is a single address region, and thus the cacheability of the L3 SRAM address region is controllable by, for example, a single bit in the caching configuration register.

For example, in response to the caching configuration register having a first (e.g., de-asserted) value, the L2 controller 320 is configured to operate in a non-caching mode, in which the L2 controller 320 provides requests to the L3 cache subsystem 308 but does not cache any data returned by the request. However, in response to the caching configuration register having a second (e.g., asserted) value, the L2 controller 320 is configured to operate in a caching mode, in which the L2 controller 320 provides requests to the L3 cache subsystem 308 and caches any data returned by the request, for example in the L2 cache 324.

As a result, when the L2 controller 320 operates in the non-caching mode, the L3 SRAM address region can be shared among multiple CPU cores (e.g., CPU cores 102a-102n), without any cache-related performance penalties, such as increased transaction volume to maintain cache coherence (e.g., victim transactions). However, the L2 controller 320 also has the flexibility to cache the L3 SRAM address region when, for example, a particular application benefits from such behavior (e.g., data stored in L3 SRAM is infrequently shared among CPU cores).

In an example, when the L2 controller 320 transitions from the non-caching mode to the caching mode (e.g., the caching configuration register or field thereof is asserted), the L2 controller 320 typically can begin caching addresses from the L3 SRAM address region without additional actions being taken. For example, because the L2 controller 320 had not previously been caching these addresses, there are no impediments to the L2 controller 320 simply beginning operation in the caching mode.

However, when it is determined (e.g., by the CPU core 302) to transition the L2 controller 320 from the caching mode to the non-caching mode (e.g., the caching configuration register or field thereof is de-asserted), additional steps may be performed before the L2 controller 320 transitions to the non-caching mode. For example, steps are taken to evict from the L2 cache 324 any lines that were cached from the L3 SRAM address region.

In this example, traffic from the CPU core 302 for addresses that map to the L3 address region is ceased. For example, the CPU core 302 (or an application executing thereon) that requested the L2 controller 320 to transition from caching mode to non-caching mode (e.g., through de-assertion of the configuration register) ceases to send requests to the L2 controller 320 directed to addresses in the L3 SRAM. At the same time, the CPU core 302 can continue to send requests to the L2 cache subsystem 306 directed to addresses other than in the L3 SRAM address region.

Then, for example in response to the de-assertion of the caching configuration register, the L2 controller 320 is configured to evict cache lines in its L2 cache 324 that correspond to the L3 SRAM address region. The L2 controller 320 can evict all cache lines in its L2 cache 320 or only those that correspond to the L3 SRAM address region. In one example, the L2 controller 320 invalidates each line in the L2 cache 324 that corresponds to the L3 SRAM address region. In another example, the L2 controller 320 writes back each line in the L2 cache 324 that corresponds to the L3 SRAM address region. In yet another example, the L2 controller 320 performs a writeback invalidate of each line in the L2 cache 324 that corresponds to the L3 SRAM address region. Examples of this disclosure are not necessarily restricted to a specific form of the eviction of lines from the L2 cache 324 corresponding to the L3 SRAM address region.

Continuing the writeback invalidate example, the L2 controller 320 performs the writeback invalidate of either its entire L2 cache 324 or the portions of the L2 cache 324 that correspond to the L3 SRAM address region. In one example, the L2 controller 320 performs a writeback invalidate operation, while in another example the streaming engine 205 is used to perform a block writeback (e.g., of the addresses in the L2 cache 324 that correspond to the L3 SRAM address region). The L2 controller 320 indicates the completion of the writeback invalidate, for example by asserting a signal to the CPU core 302 or changing a writeback invalidate register value that is polled by the CPU core 302. Once the CPU core 302 receives the indication that the writeback invalidate is complete, the CPU core 302 de-asserts the caching configuration register to disable caching of the L3 SRAM address region by the L2 cache subsystem 306. The CPU core 302 is then able to resume sending requests to the L2 cache subsystem 306 for addresses in the L3 SRAM address region, which will not be cached by the L2 controller 320.

FIG. 12 shows a flow chart of a method 1200 for operating a cache controller (e.g., L2 controller 320) in a caching or a non-caching mode, in accordance with various examples. The method 1200 begins in block 1202 with the L2 controller 320 receiving a request directed to an address in the L3 SRAM address region. In block 1204, it is determined whether the caching configuration register has a first value (e.g., is de-asserted) or a second value (e.g., is asserted). If the caching configuration register is de-asserted, the method 1200 continues to block 1206 in which the L2 controller 320 operates in the non-caching mode by providing the request to the L3 SRAM (e.g., via the L3 controller 309). The method 1200 then continues to block 1208 in which the L2 controller 320 does not cache data returned by the request in its L2 cache 324.

Returning to block 1204, if the caching configuration register is asserted, the method 1200 continues to block 1210 in which the L2 controller 320 operates in the caching mode by providing the request to the L3 SRAM (e.g., via the L3 controller 309). The method 1200 then continues to block 1212 in which the L2 controller 320 caches data returned by the request in its L2 cache 324.

Examples of the present disclosure relate to operating the L2 controller 320 to permit accesses to the L2 SRAM 322 in both aliased and un-aliased modes. In some cases, prior versions of processors utilized a non-programmable, static implementation in hardware (e.g., using multiplexers) to operate in an aliased mode. In this approach, memory was statically structured as three separate memories that could not be merged into one common memory map. Additionally, multiplexing applied to all transactions and requestors, and thus it was not possible to operate in an un-aliased mode. The examples described herein enable legacy applications to continue to utilize aliased mode as needed when accessing the L2 SRAM 322, but also does not restrict the L2 SRAM 322 to strictly aliased accesses, which increases the functionality and flexibility of the L2 cache subsystem 306 more generally.

Figure 13:
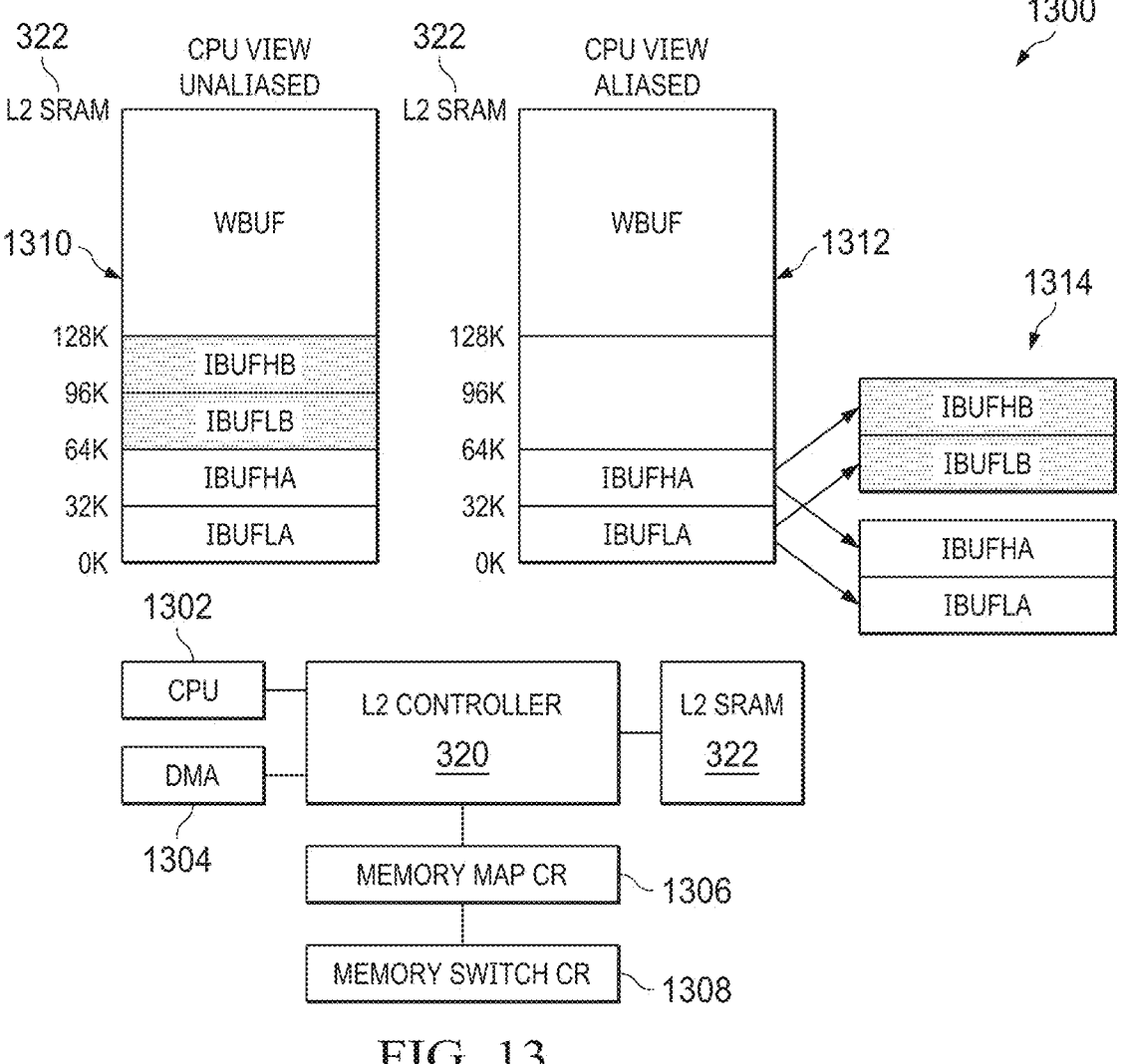
FIG. 13 shows an example of aliased and un-aliased memory operations in accordance with various examples.

FIG. 13 shows an example and block diagram 1300 of un-aliased and aliased modes of operation (e.g., of the L2 controller 320 interacting with the L2 SRAM 322) in accordance with various examples. The example 1300 includes a CPU core 1302 (e.g., similar to the CPU core 302 described above) and a DMA engine 1304. In this example 1300, the DMA engine 1304 is similar to another of the CPU cores 102 shown in FIG. 1, which are also capable of accessing the L2 cache subsystem 102a (e.g., through the shared L2 cache subsystem 108). In the example 1300, the CPU core 1302 is alternately referred to as a "producer" of data that writes to the L2 SRAM 322, while the DMA engine 1304 is alternately referred to as a "consumer" of data that reads from the L2 SRAM 322.

Both the CPU core 1302 and the DMA engine 1304 are coupled to the L2 controller 320, which is in turn coupled to the L2 SRAM 322 as explained above. Additionally, the L2 controller 320 is coupled to a memory map control register 1306 and a memory switch control register 1308, the functions of which are described further below. In some examples, the control registers 1306, 1308 are portions of a single control register, while in other examples the control registers 1306, 1308 are separate structures as shown.

In some examples, the control registers 1306, 1308 are controlled by software (e.g., executing on the CPU core 1302) as memory-mapped registers. In an example, the memory map control register 1306 specifies whether the CPU core 1302 and the DMA engine 1304 are able to view and access the full memory map of the L2 SRAM 322 (e.g., un-aliased mode) or are able to view and access an aliased memory map of the L2 SRAM 322 (e.g., aliased mode).

If the memory map control register 1306 is set for operation in the un-aliased mode, shown in the example 1310 of L2 SRAM 322, both the CPU core 1302 and the DMA engine 1304 are able to direct transactions to virtual addresses in buffers IBUFLA, IBUFHA, IBUFHLB, IBUFHB. In the un-aliased mode 1310, the L2 controller 320 is configured to direct such transactions to the corresponding physical addresses in those same buffers. Thus, in the un-aliased mode, the L2 controller 320 is configured to direct a transaction (from either CPU core 1302 or DMA engine 1304) to a virtual address in the buffer IBUFLA to the corresponding physical address in the buffer IBUFLA in the L2 SRAM 322, and so on.

If the memory map control register 1306 is set for operation in the aliased mode, shown in the example 1312 of L2 SRAM 322, both the CPU core 1302 and the DMA engine 1304 are only able to direct transactions to certain virtual addresses (e.g., in buffers IBUFLA, IBUFHA in this example). Attempts to direct a transaction to other virtual addresses (e.g., in buffers IBUFLB, IBUFHB in this example) result in an error, explained further below. In the aliased mode 1312, the L2 controller 320 is configured to direct transactions from the CPU core 1302 to a virtual address (e.g., in buffer IBUFLA) to a first physical address (e.g., also in IBUFLA) and to direct transactions from the DMA engine 1304 to the same virtual address in buffer IBUFLA to a second, different physical address (e.g., in IBUFLB). This is depicted as virtual addresses in the aliased mode 1312 of operation being mapped to different physical addresses 1314.

By operating the L2 controller 320 in the aliased mode, the CPU core 1302 as producer writes to a certain virtual address and at the same time the DMA engine 1304 as consumer reads from that same virtual address. However, due to the aliased mode of operation, the physical address being produced to by the CPU core 1302 is different than the physical address being consumed from by the DMA engine 1304. This allows the CPU core 1302 to produce to a physical buffer A (e.g., IBUFLA and IBUFHA) while the DMA engine 1304 consumes from a physical buffer B (e.g., IBUFLB and IBUFHB), despite both addressing the transactions to the virtual address.

In an example, the memory switch control register 1308 specifies which physical address a virtual address is aliased to as a function of whether the CPU core 1302 and the DMA engine 1304 "owns" a certain buffer. Ownership in this context is mutually exclusive; that is, if the memory switch control register 1308 specifies that the CPU core 1302 owns buffer A (e.g., IBUFLA and IBUFHA), then the DMA engine 1304 cannot also own buffer A. In this example, it is assumed that the owner of a buffer has its transactions aliased to physical addresses in the named buffer, while the non-owner of the buffer has its transactions aliased to physical addresses in the aliased buffer. For example, if the CPU core 1302 owns buffer A, then the L2 controller 320 is configured to direct CPU core 1302 transactions to physical addresses also in buffer A. Similarly, since the DMA engine 1304 does not own buffer A, then the L2 controller 320 is configured to direct DMA engine 1304 transactions to physical addresses in buffer B.

By managing the memory switch control register 1308, a ping pong type effect is enabled that allows the CPU core 1302 and the DMA engine 1304 to both believe they are producing to and consuming from a certain buffer (e.g., by directing transactions to virtual addresses in buffer A). However, when the memory switch control register 1308 indicates that the CPU core 1302 is the owner of the buffer A, the CPU core 1302 produces to physical addresses in the buffer A while the DMA engine 1304 consumes from physical addresses in the buffer B. Subsequently (e.g., when the CPU core 1302 is close to filling the physical addresses in buffer A with data), the memory switch control register 1308 is updated to indicate that the DMA engine 1304 is the owner of the buffer A. As a result, the DMA engine 1304 begins to consume from physical addresses in the buffer A while the CPU core 1302 begins to produce to physical addresses in the buffer B.

In a more general example, the L2 SRAM 322 includes a working buffer (WBUF), a first buffer A (e.g., including IBUFLA and IBUFHA in FIG. 13), and a second buffer B (e.g., including IBUFLB and IBUFHB in FIG. 13). Because the first, second, and working buffers are portions of the L2 SRAM 322, in one example a base address control register (not shown for simplicity) is used that specifies a base address in the L2 SRAM 322 for each of the first, second, and working buffers. In the specific example of FIG. 13, the base address control register specifies a base address for each buffer IBUFLA, IBUFHA, IBUFLB, IBUFHB, and WBUF. This allows further configurability of where these buffers reside in the L2 SRAM 322. In one example, the size of the IBUF buffers is fixed at 32 KB (e.g., from the specified base address) as shown, while the WBUF buffer extends to the end of the L2 SRAM 322 (from its specified base address). However, in another example, the size of the buffers is configurable.

In some examples, the L2 controller 320 is configured to indicate various error conditions, for example by asserting bits in an error status register (e.g., in the L2 cache subsystem 306). For example, the L2 controller 320 is configured to indicate an error in response to a request to the working buffer (WBUF) being for an address outside of an address range (e.g., in L2 SRAM 322) in which the various buffers reside.

In another example, the L2 controller 320 is configured to indicate an error in response to a request to, for example, the buffer A being for an address outside of the address range for the buffer A. The address range for the buffer A is based on the base address for the buffer A, and the size of the buffer A, which is either fixed or configurable.

In another example, when the L2 controller 320 is operating in aliased mode, the L2 controller 320 is configured to indicate an error in response to a request directed to a virtual address that maps to a physical address in the aliased buffer. Referring back to FIG. 13 for example, when operating in aliased mode 1312, an error is indicated if the CPU core 1302 or the DMA engine 1304 attempts to directly access the aliased buffer, which in this case is buffer B (e.g., IBUFLB and IBUFHB). In a general sense, in the aliased mode, accesses are permitted to virtual addresses in one buffer (e.g., buffer A) but not to virtual addresses in the other, aliased buffer (e.g., buffer B). As a result, in aliased mode, the only way to access the physical addresses of the aliased buffer B is through the aliased mode operation of the L2 controller 320.

In any of the foregoing error examples, an error clear register (e.g., in the L2 cache subsystem 306) contains fields that correspond to fields in the error status register. When a field in the error clear register is asserted, for example, the corresponding field in the error status register is cleared.

FIG. 14 shows a flow chart of a method 1400 for operating on the L2 SRAM 322 by the L2 controller 320 in an aliased mode in accordance with various examples. The method 1400 begins in block 1402 with operating the L2 controller 320 in an aliased mode in response to a memory map control register value being asserted. The method 1400 continues in block 1404 with the L2 controller 320 receiving a first request from a first CPU core (e.g., CPU core 1302) directed to a virtual address (e.g., in buffer A) in a L2 memory (e.g., L2 SRAM 322) of the L2 cache subsystem 306. The method 1400 continues in block 1406 with receiving a second request from a second CPU core (e.g., DMA engine 1304) directed to the same virtual address in the L2 SRAM 322. As a result of the L2 controller 320 operating in the aliased mode, the method 1400 continues in block 1408 with directing the first request to a physical address A in the L2 SRAM 322 (e.g., as shown at 1314 in FIG. 13) and in block 1410 with directing the second request to a physical address B in the L2 SRAM 322 (e.g., as shown at 1314 in FIG. 13).

In the foregoing discussion and in the claims, the terms "including" and "comprising" are used in an open-ended fashion, and thus mean "including, but not limited to . . . ." Also, the term "couple" or "couples" means either an indirect or direct connection. Thus, if a first device couples to a second device, that connection may be through a direct connection or through an indirect connection via other devices and connections. Similarly, a device that is coupled between a first component or location and a second component or location may be through a direct connection or through an indirect connection via other devices and connections. An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrases "ground" or similar in the foregoing discussion include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means+/−10 percent of the stated value.

The above discussion is illustrative of the principles and various embodiments of the present disclosure. Numerous variations and modifications will become apparent to those skilled in the art once the above disclosure is fully appreciated. The following claims should be interpreted to embrace all such variations and modifications.

What is claimed is:

1. A device, comprising:
a cache memory that includes a set of lines;
a cache controller; and
a first cache pipeline coupled between the cache controller and the cache memory,
wherein the cache controller is configured to:
  receive an operation directed to more than one line of the set of lines; and
  based on the operation,
    operate in a first mode to prevent any new one of a first type of non-blocking transaction from entering the first cache pipeline and permitting a new one of a second type of non-blocking transaction to enter the first cache pipeline;
    determine whether the first cache pipeline contains any of the first type of non-blocking transaction;
    based on the first cache pipeline being free of the first type of non-blocking transaction, transition from the first mode to a second mode to prevent any new one of the first type of non-blocking transaction and any new one of the second type of non-blocking transaction from entering the first cache pipeline;
    determine whether the first cache pipeline contains any transaction; and based on the first cache pipeline being free of transactions, cause the first cache pipeline to perform the operation on the cache memory.

2. The device of claim 1, wherein the first type of non-blocking transaction includes a snoop transaction.

3. The device of claim 1, wherein the second type of non-blocking transaction includes a response transaction or a victim transaction.

4. The device of claim 1, wherein the cache controller is configured to:
  based on the operation:
    prior to the first mode, operate in a third mode to prevent any new one of a blocking transaction from entering the first cache pipeline;
    determine whether first cache pipeline contains any blocking transaction; and based on the first cache pipeline being free of blocking transactions, transition from the third mode to the first mode.

5. The device of claim 4, wherein the blocking transaction includes a read transaction, a write transaction, or an instruction fetch transaction.

6. The device of claim 1, wherein the operation includes an invalidate operation, a writeback invalidate operation, or a writeback operation.

7. The device of claim 1, wherein:
the cache memory includes a first bank and a second bank;
the first cache pipeline is associated with the first bank; and
the operation is associated with the first bank and the second bank.

8. The device of claim 7, wherein:
the device further comprises a second cache pipeline coupled between the cache controller and the second bank;
in the first mode, the first type of non-blocking transaction is not permitted to enter the second cache pipeline and the second type of non-blocking transaction is permitted to enter the second cache pipeline; and
in the second mode, the first type of non-blocking transaction and the second type of non-blocking transaction are not permitted to enter the second cache pipeline.

9. The device of claim 1, wherein the cache memory is a level-two (L2) cache memory and the cache controller is an L2 cache controller.

10. The device of claim 1, further comprising:
a set of cache pipelines that includes the first cache pipeline,
wherein the cache controller is configured to:
  prior to causing the first cache pipeline to perform the operation on the cache memory, determine whether any pipeline of the set of pipelines, including the first cache pipeline, contains any transaction; and
  based on the set of pipelines, including the first cache pipeline, being free of transactions, cause the first cache pipeline to perform the operation on the cache memory.

11. A device comprising:
a cache memory that includes a set of lines;
a cache controller; and
a first cache pipeline coupled between the cache controller and the cache memory,
wherein the cache controller is configured to:
  receive an operation directed to more than one line of the set of lines; and
  based on the operation,
    operate in a first mode to prevent any new one of a blocking transaction from entering the first cache pipeline and permit a new one of a non-blocking transaction to enter the first cache pipeline;
    determine whether the first cache pipeline contains any blocking transaction; and
    based on the first cache pipeline being free of the blocking transaction, transition from the first mode to a second mode to prevent any new one of the blocking transaction and any new one of a first type of the non-blocking transaction from entering the first cache pipeline and permit a new one of a second type of the non-blocking transaction to enter the first cache pipeline.

12. The device of claim 11, wherein the first type of non-blocking transaction includes a snoop transaction.

13. The device of claim 11, wherein the second type of non-blocking transaction includes a response transaction or a victim transaction.

14. The device of claim 11, wherein the blocking transaction includes a read transaction, a write transaction, or an instruction fetch transaction.

15. The device of claim 11, wherein the operation includes an invalidate operation, a writeback invalidate operation, or a writeback operation.

16. The device of claim 11, wherein the cache controller is configured to:

determine whether the first cache pipeline contains any of the first type of non-blocking transaction;

based on the first cache pipeline being free of the first type of non-blocking transaction, transition from the second mode to a third mode to prevent any new one of the first type of the non-blocking transaction and any new one of the second type of the non-blocking transaction from entering the first cache pipeline;

determine whether the first cache pipeline contains any transaction; and based on the first cache pipeline being free of transactions, cause the first cache pipeline to perform the operation on the cache memory.

17. The device of claim 16, further comprising:

a set of cache pipelines that includes the first cache pipeline, wherein the cache controller is configured to:

prior to causing the first cache pipeline to perform the operation on the cache memory, determine whether any pipeline of the set of pipelines, including the first cache pipeline, contains any transaction; and based on the set of pipelines, including the first cache pipeline, being free of transactions, cause the first cache pipeline to perform the operation on the cache memory.

18. The device of claim 11, wherein:

the cache memory includes a first bank and a second bank;

the first cache pipeline is associated with the first bank; and the operation is associated with the first bank and the second bank.

19. The device of claim 18, wherein:

the device further comprises a second cache pipeline coupled between the cache controller and the second bank;

in the first mode, the blocking transaction is not permitted to enter the second cache pipeline and the non-blocking transaction is permitted to enter the second cache pipeline; and in the second mode, the blocking transaction and the non-blocking transaction are not permitted to enter the second cache pipeline.

20. The device of claim 11, wherein the cache memory is a level-two (L2) cache memory and the cache controller is an L2 cache controller.

* * * * *